United States Patent [19]

Nelson

[11] 4,425,964

[45] Jan. 17, 1984

[54] SOLAR COLLECTOR-TYPE HEAT TRANSFER APPARATUS

[75] Inventor: Kenneth L. Nelson, Albert Lea, Minn.

[73] Assignee: King-Seeley Thermos Co., Prospect Heights, Ill.

[21] Appl. No.: 365,447

[22] Filed: Apr. 5, 1982

Related U.S. Application Data

[63] Continuation of Ser. No. 156,998, Jun. 6, 1980, abandoned.

[51] Int. Cl.³ .............................. F28F 1/22; F24J 3/02
[52] U.S. Cl. .................................... 165/171; 126/441; 126/446; 126/448; 126/449
[58] Field of Search ........................ 126/441, 446–449; 165/150, 171

[56] References Cited

U.S. PATENT DOCUMENTS

| 966,070 | 8/1910 | Bailey | 126/446 |
|---|---|---|---|
| 3,194,228 | 7/1965 | Bargues | 126/447 |
| 3,380,518 | 4/1968 | Canteloube et al. | 165/171 |

FOREIGN PATENT DOCUMENTS 2609091 9/1976 Fed. Rep. of Germany ...... 126/449

Primary Examiner—Sheldon J. Richter
Attorney, Agent, or Firm—Harness, Dickey & Pierce

[57] ABSTRACT

A conduit is arranged in a generally serpentine configuration and is provided with a plurality of heat transfer elements which are disposed interjacent spaced parallel sections of the conduit. An application of the assemblage consisting of the aforesaid serpentine conduit and associated heat transfer elements is a solar collector for use with solar heating systems and the like.

4 Claims, 40 Drawing Figures

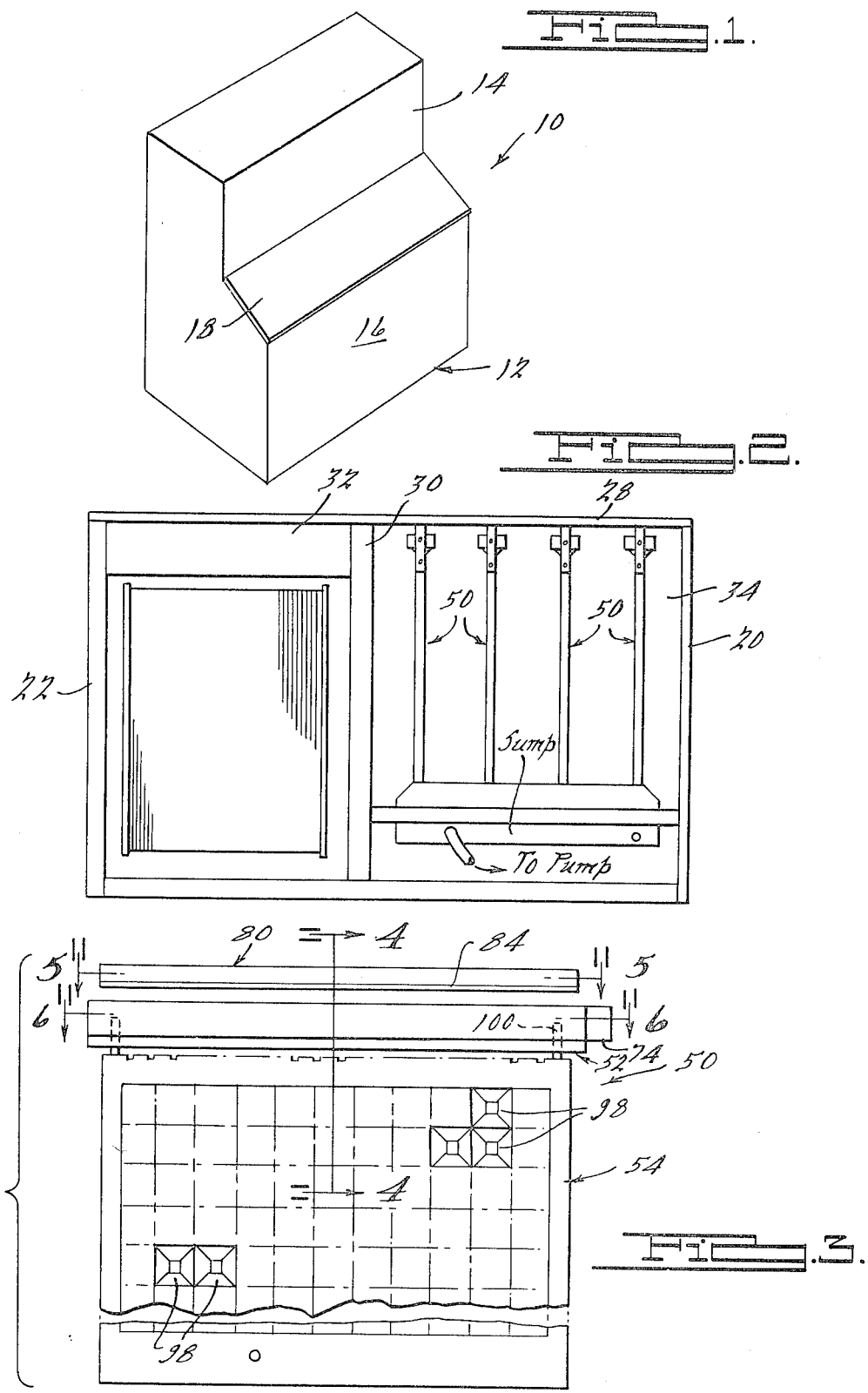

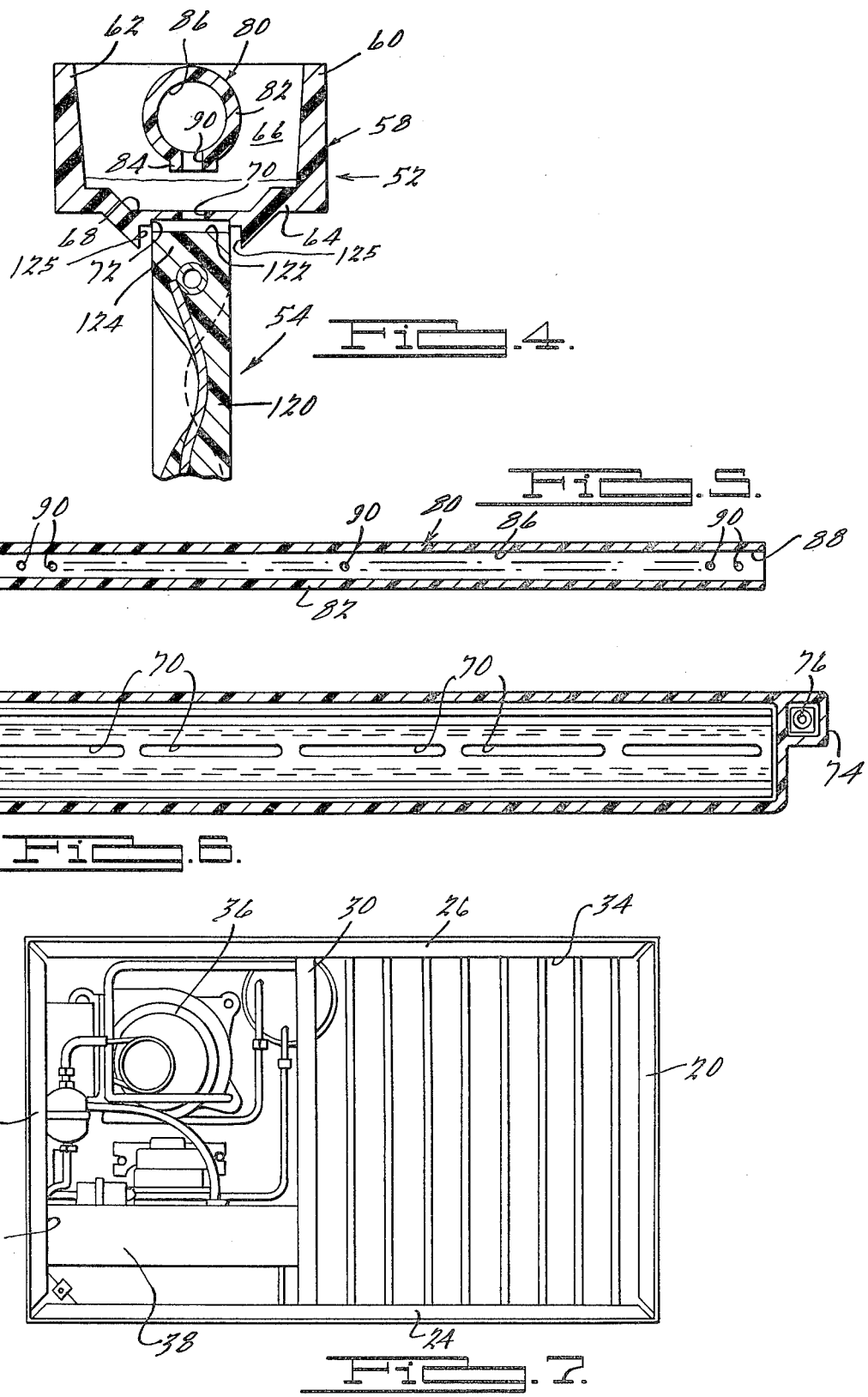

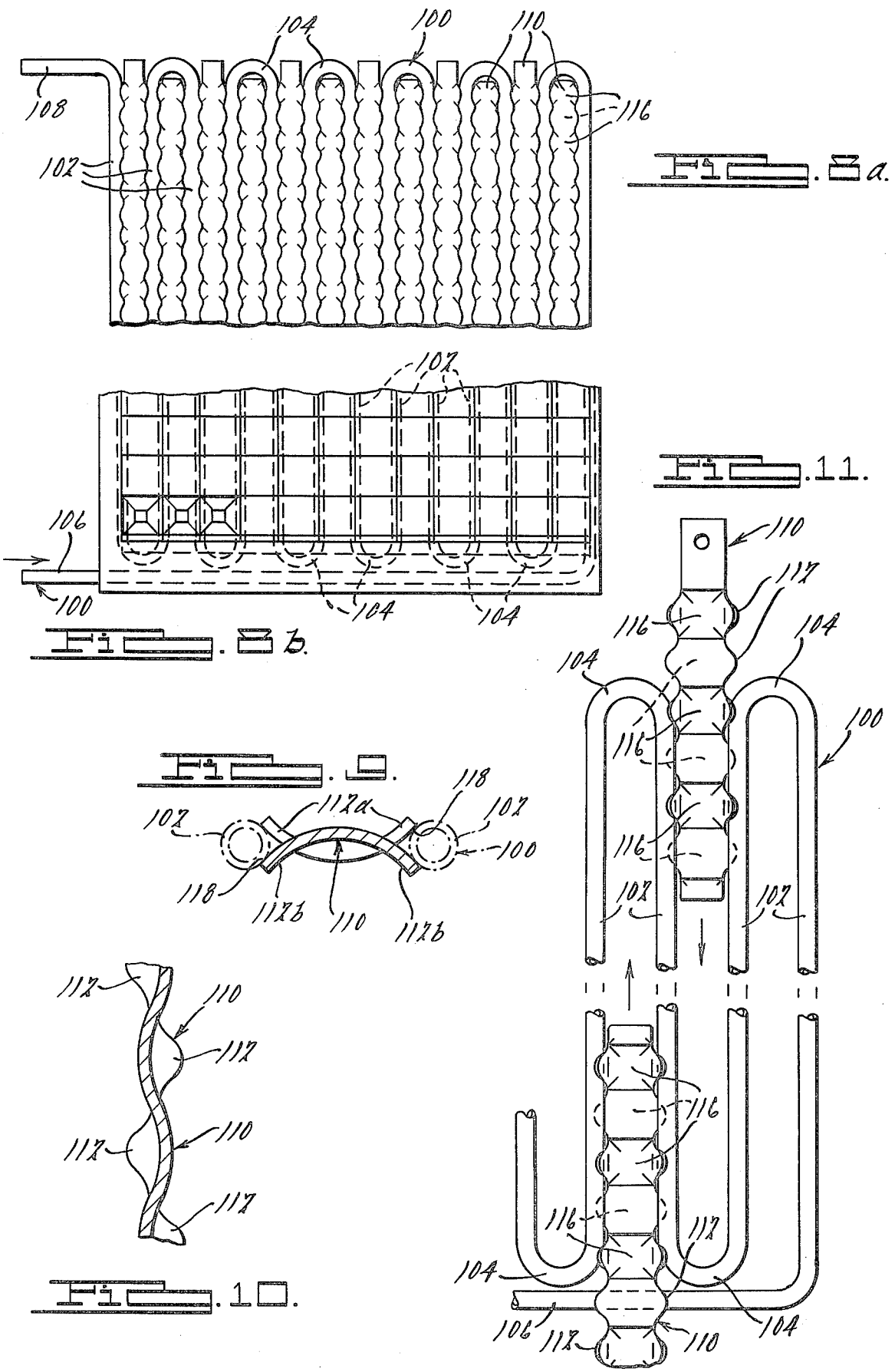

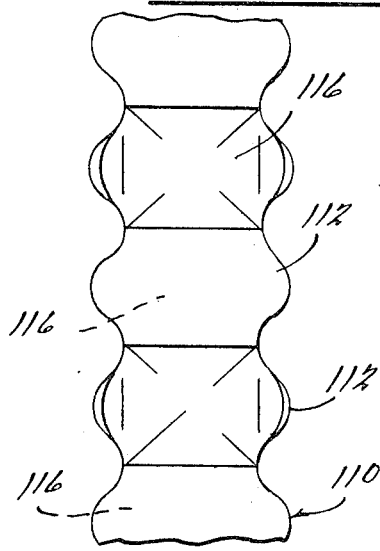
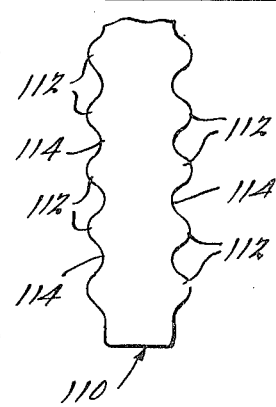
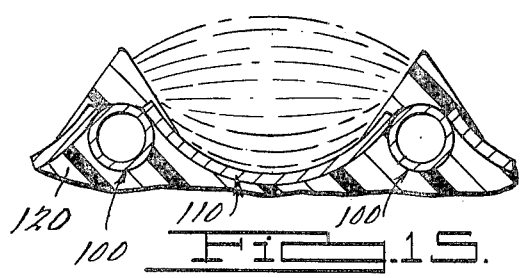
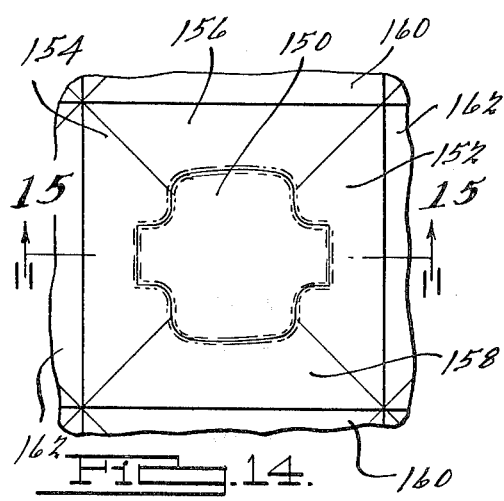
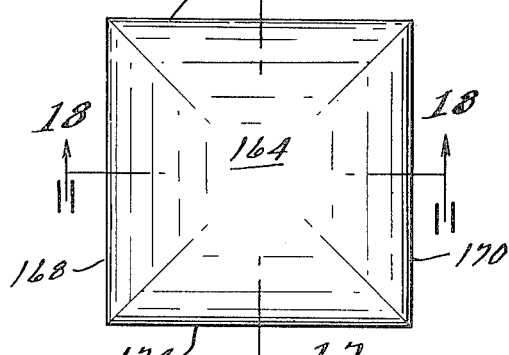
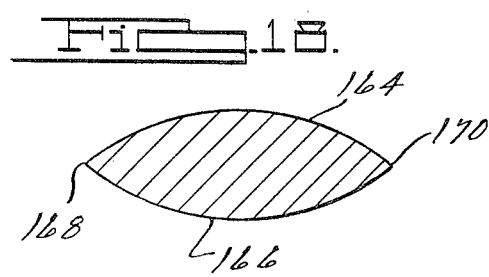

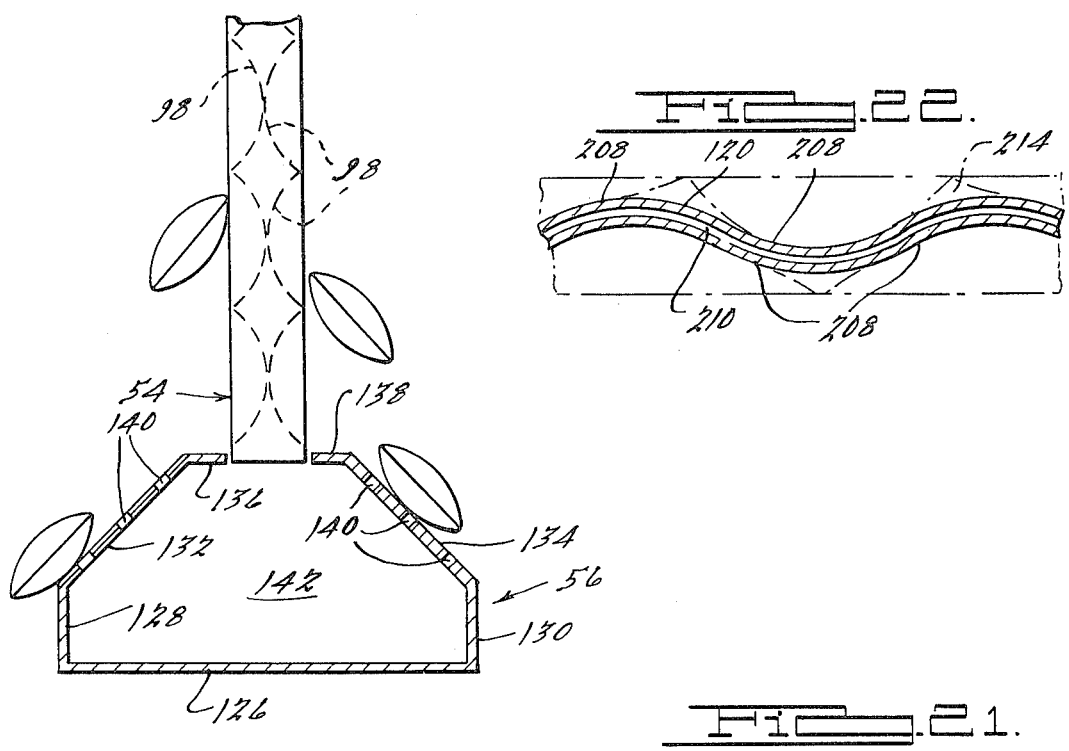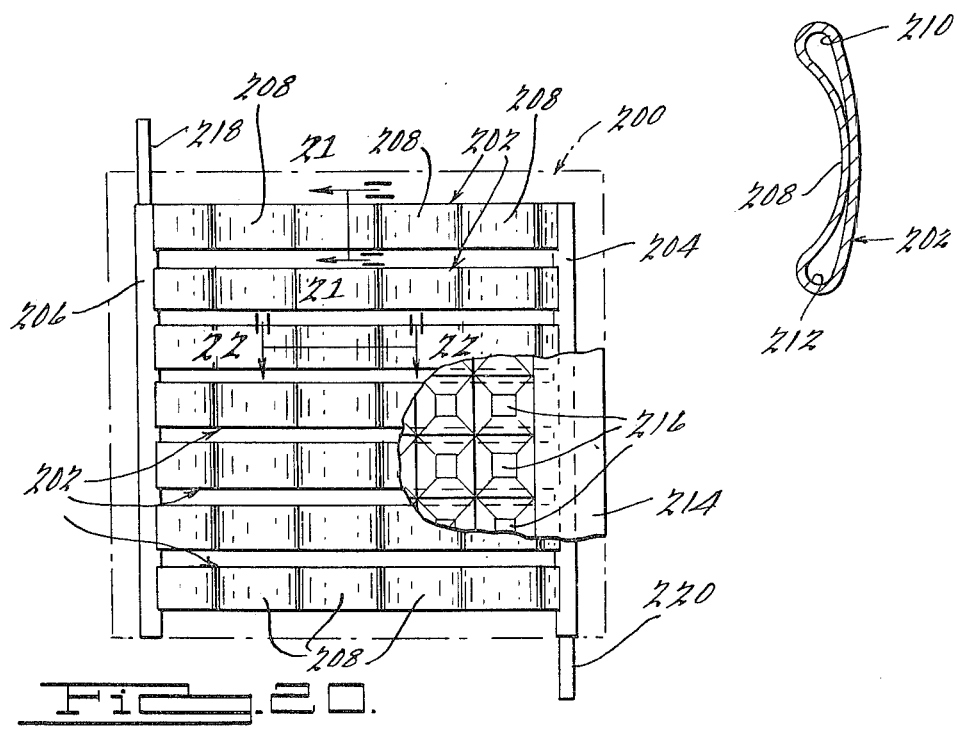

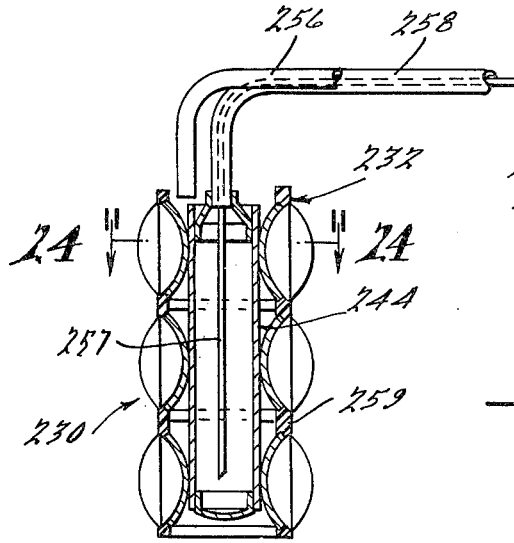
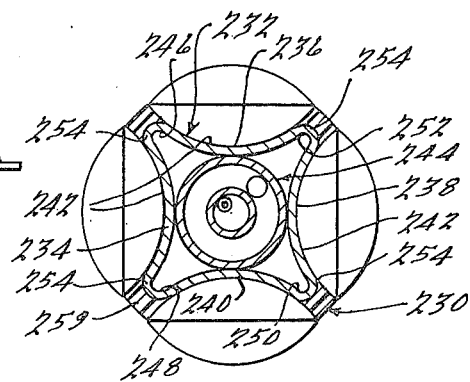
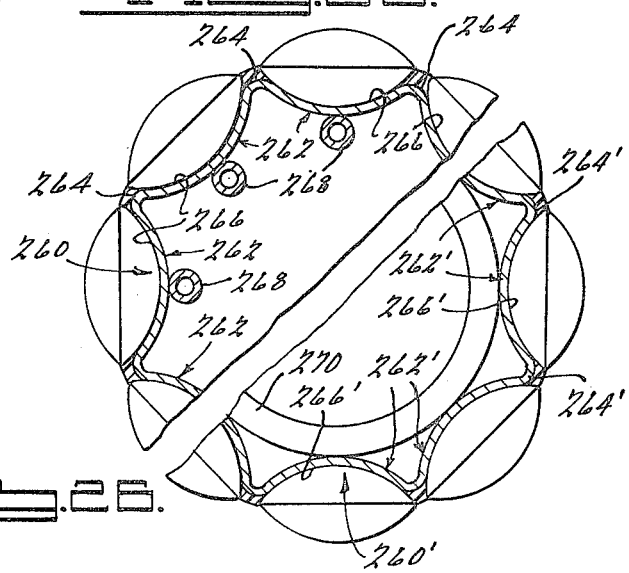
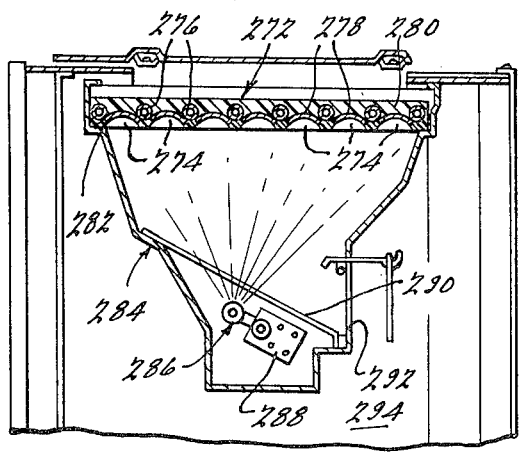
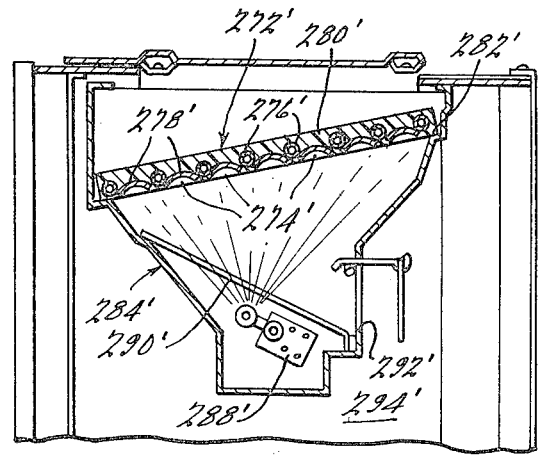

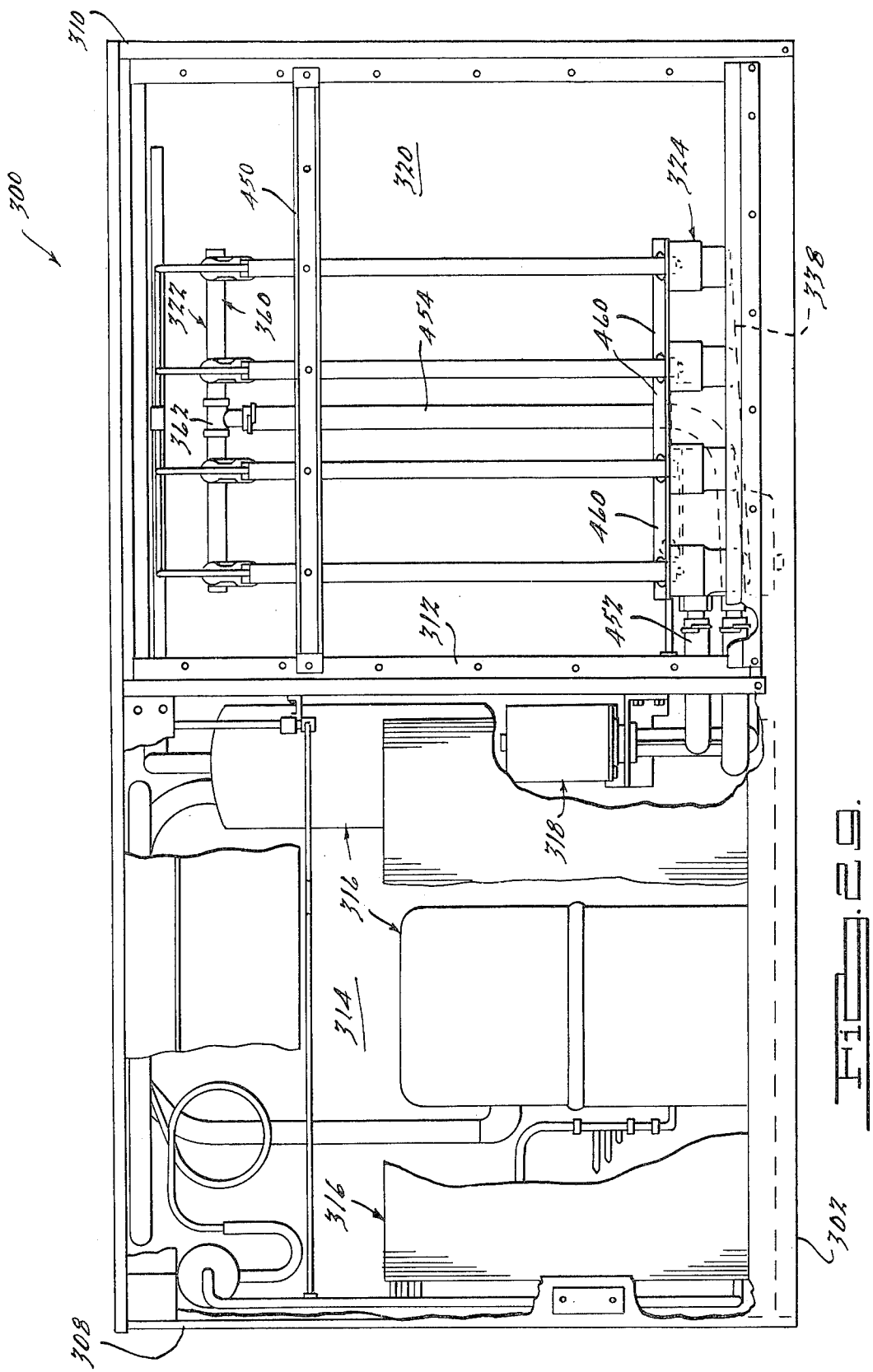

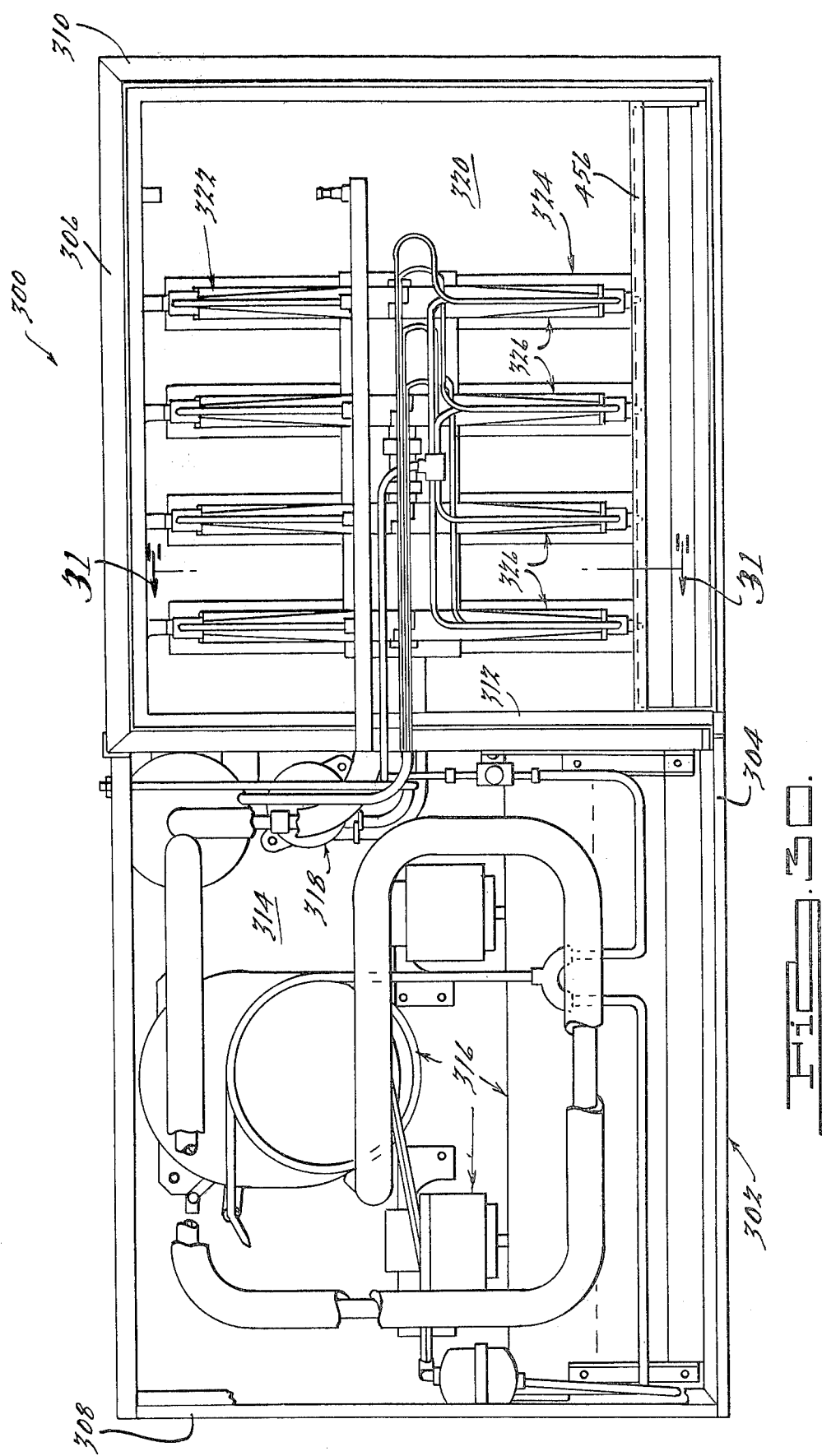

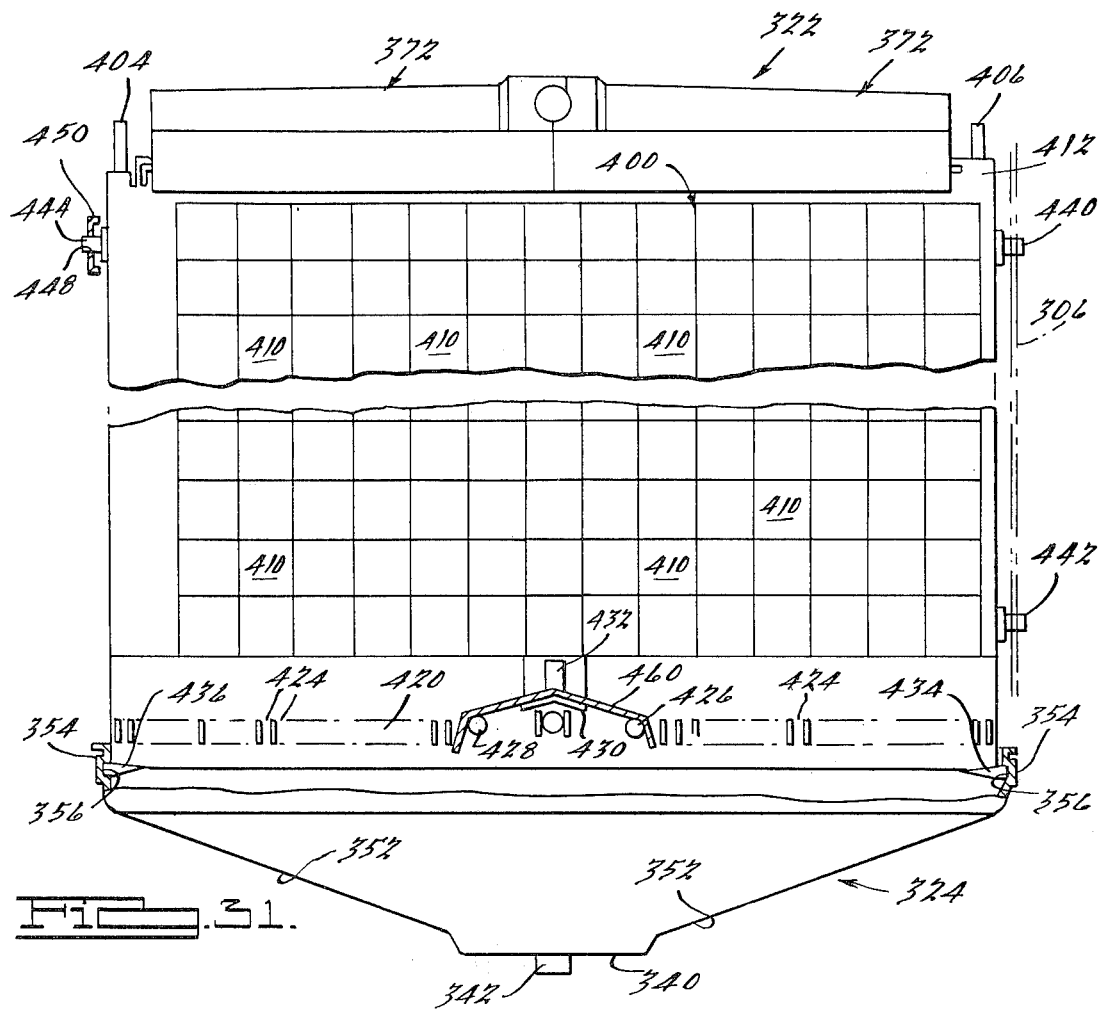
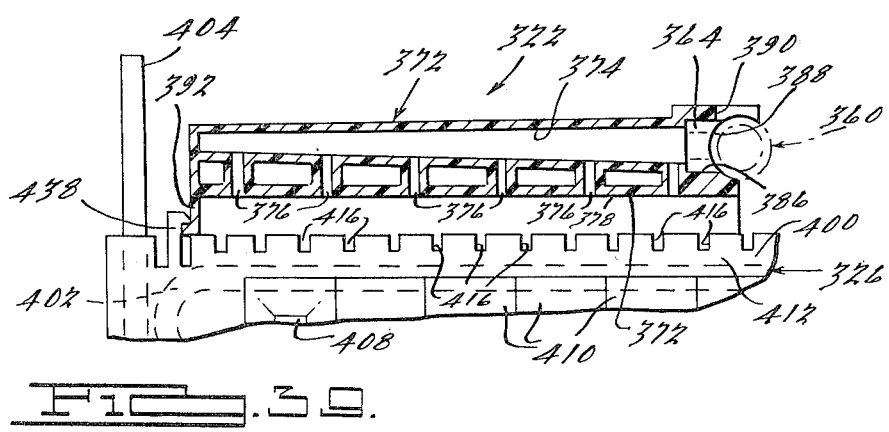

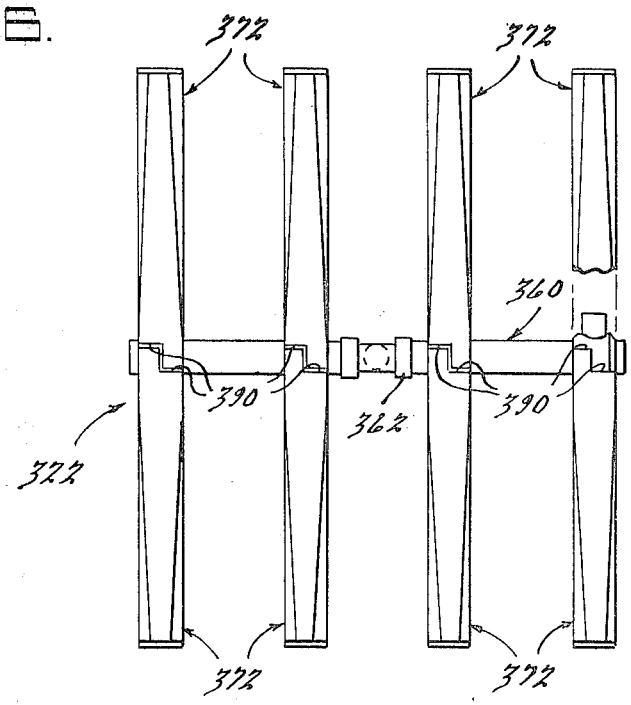
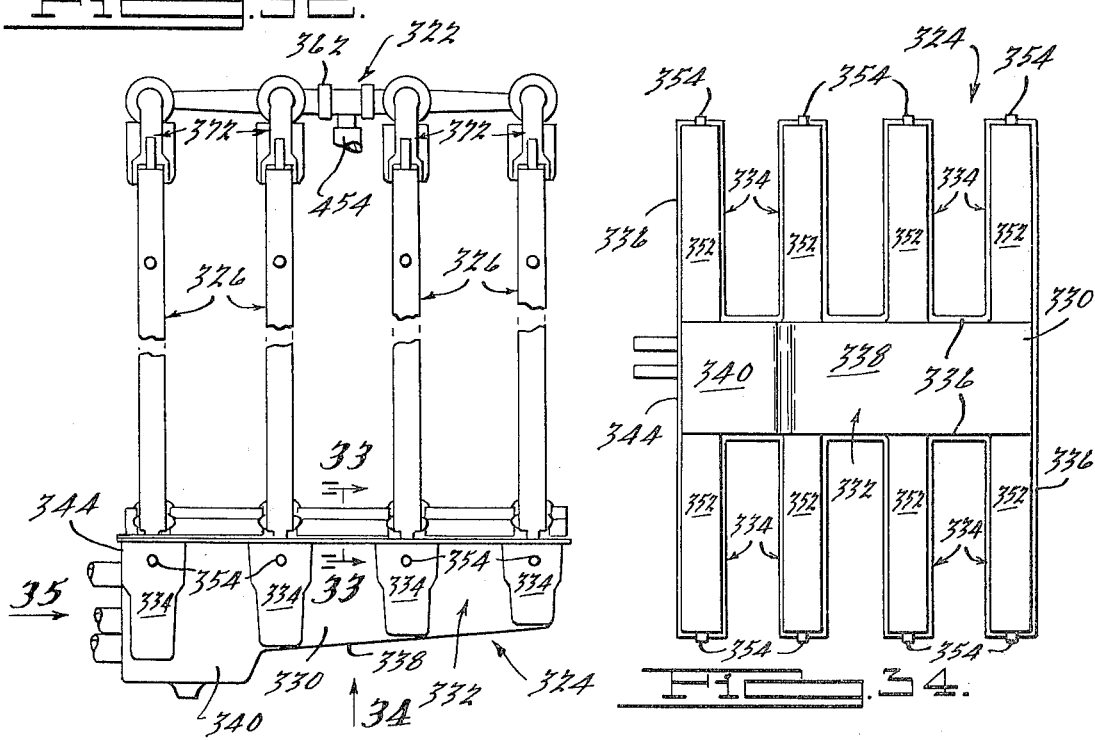

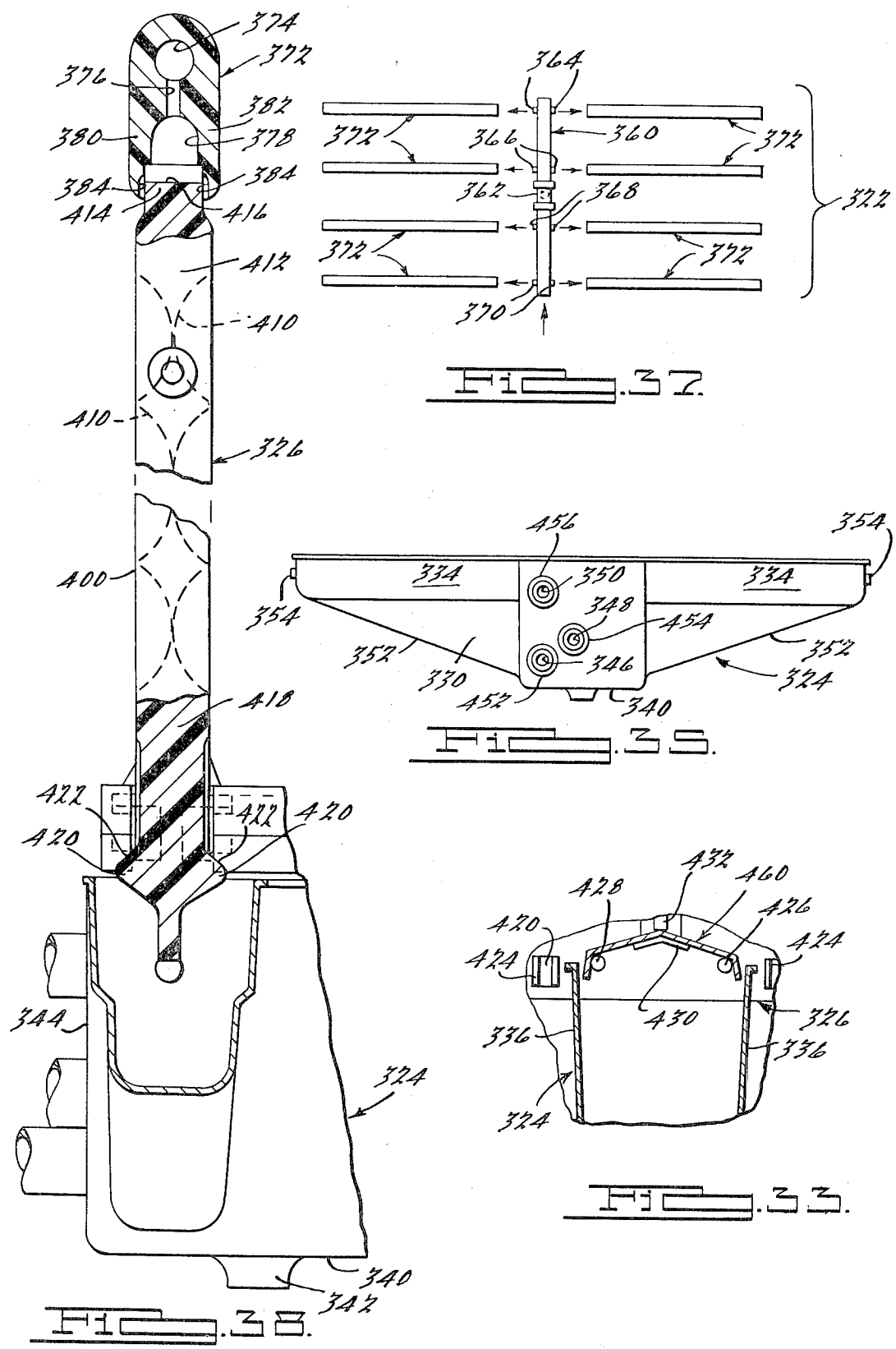

SOLAR COLLECTOR-TYPE HEAT TRANSFER APPARATUS

This is a continuation, of application Ser. No. 156,998, filed June 6, 1980, now abandoned.

BACKGROUND OF THE INVENTION

Generally speaking, the present invention is directed toward a new and improved ice product or ice cube of the type which is commonly utilized for cooling beverages and the like, and toward a new and improved ice making machine for producing such ice products. More specifically, the present invention is directed toward an ice product having improved ice storage, appearance, and dispensing and displacement characteristics, as compared to various types of prior art ice in cube or other form. Additionally, the present invention is directed toward an ice making machine for producing the aforesaid products which incorporates a novel combination evaporator and ice form assembly and method of making the same. The assembly, in one preferred form of the present invention, includes a combination evaporator and ice form plate which is intended to be vertically arranged and have ice make-up water cascaded over the opposite sides thereof such that the ice product or "cubes" are formed in ice forming pockets or recesses formed on the opposite sides of the assembly. A novel water manifold arrangement is provided adjacent the top of the ice form assemblies for distributing the ice make-up water thereover. It is contemplated that one or more of such ice form assemblies, in alternative forms of the present invention, be mounted in horizontal or inclined positions. Additionally, while in the preferred form of the present invention, the ice forming pockets or recesses are disposed in staggered relationship on the opposite sides of each of the combination evaporator and ice form assemblies, it is contemplated that the ice forming pockets could be arranged in nonsymmetrical arrangement relationship or formed around the periphery of an annular or polygonally-shaped structure, as will hereinafter be described in detail.

The combination evaporator and ice form assemblies each include an evaporator conduit that is arranged in a predetermined configuration so as to cooperate with a plurality of heat transfer elements which partially define the ice forming pockets. As is well known in the art, the evaporator conduit serves to communicate refrigerant through the evaporator assembly to effect freezing of the ice make-up water communicated to the ice forming pockets, and during the harvest cycle, hot refrigerant gases are circulated through the conduit to effect release of the thereto formed ice cubes, as will hereinafter be described in detail. A preferred assemblage of the evaporator conduit and associated heat transfer elements is a monolithic structure resulting from subjecting such assembly to a molding operation wherein a polymeric material, such as plastic, is molded around and through the interstices of the assembly to define the marginal edge portions of the ice forming pockets. The heat transfer members are formed such that the pockets on the opposite sides of the assemblies are staggered with respect to one another to provide for a highly compact arrangement which is efficient insofar as space requirements and also insofar as the energy requirements needed to effect heat transfer from the ice make-up water being supplied to the ice forming pockets, whereby the ice producing capacity of the present invention, for a given measure of space and a given refrigeration system, is considerably greater than various types of prior art arrangements. An additional feature of the present invention resides in the elimination of the need of any spray bars or other water distributing devices which have been heretofore rotatably or oscillatably mounted in prior art arrangements for supplying water to associated ice molds. Accordingly, the number of moving parts of the present invention is minimized to the extreme, whereby to provide for economy of production, maintenance, and so to assure for a long and effective operational life, as will hereinafter be described in detail.

SUMMARY OF THE INVENTION

This invention relates generally to refrigeration equipment, and more particularly, to a new and improved method and apparatus for producing ice products, such as ice cubes, and to a new and improved ice product produced by said apparatus.

It is accordingly a general object of the present invention to provide a new and improved ice making machine.

It is another object of the present invention to provide a new and improved ice product which is generally referred to herein as an "ice cube".

It is a more particular object of the present invention to provide a new and improved ice making machine which is of a more compact design as compared to comparable apparatus in the prior art and as such, provides for increased ice making capacity for a given measure of space, as compared to said prior art designs.

It is another object of the present invention to provide a new and improved ice making machine having less moving parts than comparable ice making machines of the prior art and hence will be more dependable in operation and inexpensive to manufacture and maintain.

It is another object of the present invention to provide a new and improved ice making maching which can be easily serviced.

It is a further object of the present invention to provide a new and improved ice making machine having reduced energy requirements as compared to comparable machines heretofore known and used.

It is a further object of the present invention to provide a new and improved ice making machine which is improved from a cost and complexity standpoint, as compared to prior art designs, through the elimination of close tolerance parts which must be mounted for rotary or oscillatory movement and which embody spray jets and the like that have a tendency to become plugged or otherwise render the prior art device inoperative or at least ineffective and inefficient.

It is another object of the present invention to provide a new and improved ice making machine which incorporates a novel evaporator and ice form assembly therein that permits convenient modification to change the size of the ice product (cubes) produced thereby.

It is still another object of the present invention to provide a novel heat transfer apparatus consisting of a generally serpentine shaped conduit having a plurality of heat transfer elements associated therewith, which assemblage may be used as a solar collector in a solar heating system or the like.

It is a related object of the present invention to provide a new method of fabricating the combination evaporator and ice form assembly wherein a portion of the assembly is formed, as by injection molding, a moldable polymeric material, such as plastic.

It is another object of the present invention to provide a new and improved ice making machine wherein the aforementioned combination evaporator and ice form may be mounted vertically, horizontally or inclined depending upon the desired application of the machine.

It is still another object of the present invention to provide an ice making machine having the aforesaid improved combination evaporator and ice form assembly wherein the ice make-up water which is to be applied to the assembly may be cascaded thereover, or be applied by conventional water spray bars or the like.

It is still another object of the present invention to provide a new and improved combination evaporator and ice form assembly of the above character wherein the evaporator conduit contained therein functions to circulate refrigerant during a freezing cycle and to communicate hot defrost gases during a subsequent thawing cycle.

It is yet another object of the present invention to provide a new and improved method of making an ice product.

It is a related object of the present invention to provide a new and improved ice product which has improved the liquid displacement characteristics and which minimizes ice bridging during prolonged storage thereof.

It is still another object of the present invention to provide a new and improved ice product which has an improved aesthetic appearance and is highly splash-resistant when a liquid is poured thereover.

It is still another object of the present invention to provide a new and improved ice making machine which satisfies the standards of sanitation as established by local, state and federal authorities in connection with the production and dispensing of ingestible food products.

It is still another object of the present invention to provide a new and improved ice making machine which will have a long and effective operational life.

It is yet another object of the present invention to provide a new and improved ice making machine of the above character wherein a plurality of generally vertically arranged combination evaporator and ice forms are mounted in spaced parallel relationship such that the ice cubes formed thereby may drop downwardly between the assemblies into a suitable storage bin or the like located therebelow, and which has the advantage of permitting successive machines to be stacked on top of one another so that the ice cubes formed by upper machines may drop downwardly between the combination evaporator and ice form assemblies of machines located therebelow and thereafter into a suitable ice storage or receiving facility.

Other objects and advantages of the present invention will become apparent from the following detailed description taken in conjunction with the accompanying drawings.

BRIEF DESCRIPTION OF THE DRAWINGS

FIG. 1 is an elevated perspective view of an ice making machine incorporating the principles of the present invention therein;

FIG. 2 is a front elevational view of a portion of the ice making section of the ice making machine shown in FIG. 1;

FIG. 3 is an exploded assembly view of one of the combination evaporators and ice form assemblies embodying the present invention;

FIG. 4 is an enlarged fragmentary cross-sectional view of a portion of the assembly shown in FIG. 3;

FIG. 5 is a longitudinal cross-sectional view of the water manifold member incorporated in the structure shown in FIG. 4;

FIG. 6 is a longitudinal cross-sectional view of the water distribution enclosure member incorporated in the structure shown in FIG. 4;

FIG. 7 is a top elevational view of the structure shown in FIG. 2;

FIG. 8a is a fragmentary side elevational view of the assemblage consisting of the serpentine evaporator conduit and associated head transfer elements which are incorporated in the combination evaporator and ice form assemblies and which assemblage is depicted in an exemplary form of a solar collector for use with solar heating systems and the like.

FIG. 8b is a fragmentary side elevational view of one of the combination evaporator and ice form assemblies incorporated in the ice making machine shown in FIG. 1;

FIG. 9 is an enlarged transverse cross-sectional view of one of the heat transfer elements and associated refrigerant conduits embodied in the assembly shown in FIGS. 8a and 8b;

FIG. 10 is an enlarged fragmentary longitudinal cross-sectional view of the heat transfer element shown in FIG. 9;

FIG. 11 is an enlarged fragmentary assembly view of a portion of the evaporator conduit and two of the associated heat transfer elements incorporated in the assembly shown in FIGS. 8a and 8b;

FIG. 12 is an enlarged fragmentary side elevational view of the heat transfer element shown in FIG. 10;

FIG. 13 is a view similar to FIG. 12 and illustrates the portion of the heat transfer element thereof in a preformed configuration;

FIG. 14 is an enlarged side elevational view of one of the ice forming pockets or cups embodied in the assembly shown in FIG. 8;

FIG. 15 is an enlarged transverse cross sectional view taken substantially along the line 15—15 of FIG. 14 and discloses the shape of the ice product being formed within the ice forming pocket as it increases in size during the freezing cycle of the ice making machine of the present invention;

FIG. 16 is a side elevational view of one of the ice products or ice "cubes" produced by the ice making machine of the present invention;

FIG. 17 is a transverse cross sectional view taken substantially along the line 17—17 of FIG. 16;

FIG. 18 is a transverse cross sectional view taken substantially along the lines 18—18 of FIG. 16;

FIG. 19 is an enlarged fragmentary side elevational view of the lower end of one of the combination evaporator and ice forming assemblies embodied in the ice making machine of the present invention;

FIG. 20 is a view similar to FIG. 8 and illustrates a modified embodiment of the combination evaporator and ice form assembly of the present invention;

FIG. 21 is an enlarged transverse cross sectional view taken substantially along the line 21—21 of the refrigerant conduit incorporated in the assembly shown in FIG. 20;

FIG. 22 is an enlarged fragmentary cross sectional view taken substantially along the line 22—22 of FIG. 20;

FIG. 23 is a side elevational view, partially broken away, of another modified embodiment of the combination evaporator and ice form assembly of the present invention;

FIG. 24 is a transverse cross sectional view taken substantially along the line 24—24 of FIG. 23;

FIG. 25 is a view similar to FIG. 24 and illustrates yet another embodiment of the combination evaporator and ice form assembly of the present invention;

FIG. 26 is a view similar to FIG. 25 and illustrates yet another embodiment of the present invention wherein the evaporator coil of the combination evaporator and ice form is arranged in a generally helical configuration;

FIG. 27 is a transverse cross sectional view of an alternate embodiment of an ice making machine of the present invention and illustrates the application of ice make-up water to the ice forms by means of a water spraying mechanism located below the combination evaporator and ice form assembly;

FIG. 28 is a view similar to FIG. 27 and illustrates yet another embodiment of the present invention wherein the combination evaporator and ice form assembly is mounted in an inclined orientation;

FIG. 29 is a view similar to FIG. 2 and illustrates yet another embodiment of the ice making machine of the present invention;

FIG. 30 is a view similar to FIG. 7 and comprises a top elevational view of the structure shown in FIG. 29;

FIG. 31 is a side elevational view of one of the combination evaporator and ice form assemblies embodied in the ice making machine shown in FIGS. 29 and 30;

FIG. 32 is a side elevational view of the combination evaporator and ice form assemblies shown in FIG. 31, as seen in operative association with their associated make-up water manifold and water sump components;

FIG. 33 is an enlarged fragmentary cross-sectional view taken substantially along the line 33—33 of FIG. 32;

FIG. 34 is a bottom elevational view of the sump structure shown in FIG. 32, as seen in the direction of the arrow 34 thereof;

FIG. 35 is an end elevational view of the sump structure shown in FIG. 34, as seen in the direction of the arrow 35 of FIG. 32;

FIG. 36 is a top elevational view, partially broken away, of the water manifold components shown in FIG. 32;

FIG. 37 is an exploded assembly view, partially schematic, of the water manifold assembly shown in FIG. 36;

FIG. 38 is a longitudinal cross-sectional view of one of the combination evaporator and ice forms and associated water manifold and sump embodied in the structure shown in FIG. 32; and FIG. 39 is an enlarged fragmentary cross-sectional view of a portion of the water manifold structure depicted in FIG. 38.

DESCRIPTION OF THE PREFERRED EMBODIMENTS

Referring now in detail to the drawings, an ice making machine 10, in accordance with one preferred embodiment of the present invention, is shown generally as comprising an enclosure or cabinet 12 having an upper ice making section 14 and a lower ice receiving and/or storage section 16 which is provided with a suitable access door or the like 18. As best seen in FIG. 7, the upper ice making section 14 of the enclosure 12 includes a pair of laterally spaced, generally vertically disposed end wall sections 20, 22 and front and rear wall sections which extend laterally between the end wall sections 20, 22 and are identified by the numerals 24, 26, respectively. Disposed interiorly of the ice making section 14 is a supporting partition or wall, generally designated by the numeral 30, which is arranged generally parallel to the end wall sections 20, 22 and extends between the front wall section 24 and the rear wall section 26 so as to divide the interior of the section 14 into a refrigeration area 32 and an ice making area 34. As is conventional in the art, the refrigerating area 32 is provided with a suitable refrigeration compressor 36 and condenser 38 which cooperate with an evaporator system in the area 34 (later to be described), all of which are connected through conventional refrigeration lines and function in the usual manner such that gaseous refrigerant at relatively high pressure is supplied by the compressor 36 to the condenser 38, the refrigerant being cooled and liquified as it passes through the condenser 38. The thus cooled and liquified refrigerant flows from the condenser 38 to the evaporator(s) where the refrigerant is vaporized by the transfer of heat thereto from water which is being formed into ice. The gaseous refrigerant then flows from the evaporator(s) back to the inlet or suction side of the compressor 36 for recycling.

It will be appreciated, of course, that the present invention is not intended to be limited to the specific construction of the enclosure 12 of the ice making machine 10 (or the enclosure 302 of the machine 300 hereinafter described), since the principles can be adopted in various types of enclosures and/or may be incorporated with various existing types of refrigeration systems which do not necessarily require that the various structural components making up the present invention be operatively disposed within an enclosure, such as the enclosure 12. Additionally, the structural relationship of the ice making section 14 being disposed above the ice storage section 16, as is depicted in FIG. 1, is in no way intended to be limiting to the principles of the present invention since the ice storage area which is associated with the ice making apparatus of the present invention may be located above, adjacent or remote therefrom without departing from the scope of the present invention.

In accordance with the principles of the present invention, the ice making machine 10, and in particular, the ice making area 34 thereof, is adapted to operatively contain one or more combination evaporator and ice form assemblies which are adapted to receive ice make-up water from a suitable source thereof and cooperate with the refrigeration system in the area 32 of the enclosure 12 for producing the ice products which, for the purposes of convenience, will hereafter be referred to as ice "cubes", although in a truest technical sense, the ice product produced by the ice making machine of the present invention does not comprise ice in geometric cube form. By way of example, in FIG. 2 the ice making machine 10 is shown as being provided with four of the aforesaid ice making assemblies which are generally designated by the numeral 50 and are arranged in generally spaced parallel relationship within the enclosure area 34. It will be appreciated, of course, that the ice making machine 10 (or the machine 300 described hereinafter) may be provided with more or less of such assemblies 50 without departing from the scope or fair meaning of the present invention and that the orientation thereof within the enclosure 12 may be modified somewhat without departing from the inventive concepts hereof.

As best seen in FIGS. 3, 4 and 19, each of the assemblies 50 comprises an upper water manifold section 52, an intermediate generally flat plate-like combination evaporator and ice form section 54, and a lower sump and ice directing section 56, with the various assemblies 50, as previously described, being arranged in side-by-side relation within the ice making area 34 of the enclosure 12, as best seen in FIG. 2. By virtue of the fact that each of the assemblies 50 shown in FIG. 2 of the present invention, and particularly, the sections 52, 54 and 56 thereof, are substantially identical in construction and operation, the following detailed description of one of the assemblies 50 is intended to be applicable to each of said assemblies 50 incorporated in the ice making machine 10.

As best seen in FIGS. 4 and 6, the water manifold section 52 of the assembly(s) 50 comprises an elongated open upper sided enclosure 58 comprising a pair of spaced parallel, generally vertically disposed side walls 60, 62 and a bottom wall which extends generally horizontally between the side walls 60, 62 and defines therewith an elongated cavity, generally designated by the numeral 66. As shown in FIG. 6, the opposite ends of the enclosure 58 are closed by upstanding end wall sections, and the inner side of the bottom wall section 64 is formed with a generally downwardly depressed central area 68 within which a series of generally longitudinally aligned, vertically disposed slots 70 are formed which communicate the interior of the cavity 66 with the underside of the enclosure 58. The underside of the bottom wall section 64 is formed with an elongated continuous recess 72 which cooperates in a manner hereinafter to be described with the associated combination ice form and evaporator section 54 of the assembly 50. One end of the enclosure 68 is provided with an overflow section, generally designated by the numeral 74, which is provided with a suitable overflow passage 76 in the lower end thereof and into which ice make-up water in excess of the quantity required to form ice within the assembly 50 during a particular freezing cycle, along with any undesirable water contaminants, may be communicated back to the system drain or the like, as is well known in the art.

As shown in FIGS. 3, 4 and 5, disposed within the elongated cavity 66 of the enclosure 58 is a generally tubular-shaped water conduit member, generally designated by the numeral 80. The member 80 comprises a generally cylindrically-shaped body section 82 having a downwardly directed water distribution section 84 formed along the lower side thereof and extending generally coextensive thereof. The cylindrical section 82 is formed with an elongated internal tapered bore 86 having an inlet end 88 at one end thereof which is intended to be connected to a suitable source of ice make-up water (not shown), such as a conduit which connects the conduit member 80 to the associated water sump via a suitable water pump. The opposite end of the tapered bore 86 is closed so that all water being communicated thereinto will be communicated to a plurality of generally longitudinally spaced, vertically disposed discharge or outlet ports 90. As best seen in FIG. 4, the ports 90 are arranged generally vertically above the plurality of slots 70 formed in the bottom wall section 64 of the enclosure 58. The purpose of the tapered configuration of the bore 86 is to provide for the uniform distribution of water to the plurality of discharge ports 90, with the reduction in diameter of the bore 86 from the inlet end 88 thereof to the closed opposite end thereof being correlated with the sum of the areas of the ports 90 such that relatively uniform quantity of water is discharged downwardly through the ports 90 along the entire longitudinal plurality thereof, whereby a uniform supply of water will be introduced into the interior of the enclosure 58 and be communicated downwardly through the plurality of slots 70 for purposes hereinafter to be described.

Referring now in detail to the combination ice form and evaporator section 54 of the assembly 50, as best illustrated in FIGS. 3 and 8, the section 54 comprises a relatively thin, generally rectangularly-shaped monolithic body 96 which is formed with a plurlity of ice forming pockets, recesses or forms, generally designated by the numeral 98, on the opposite sides thereof. The ice forming pockets are arranged in vertical rows, with the rows on one side of the section 54 being staggered with the rows on the opposite side thereof, but with the pockets 98 in each of the rows being vertically aligned with recpect to the pockets 98 of the row thereof on the opposite side of the body 96. Disposed within the section 54 is an elongated evaporator conduit, generally designated by the numeral 100, which is formed into a serpentine configuration consisting of a plurality of generally horizontally disposed, spaced parallel conduit sections 102 which are interconnected with one another in a serial fashion by means of generally U-shaped intermediate sections 104, as best depicted in FIG. 11. The evaporator conduit 100 includes an inlet end section 106 and an outlet section 108 which are connected in a conventional manner with the refrigeration system of the ice making machine 10, whereby refrigerant may be circulated through the conduit 100 to effect the freezing of ice make-up water communicated to the plurality of pockets 98 during a freezing cycle of the present invention, and whereby hot refrigerant gases may be circulated through the conduit 100 during a harvest cycle to effect release of the ice cubes formed during the previous freezing cycle, as will be hereinafter described in detail.

Disposed between each pair of adjacent conduit sections 102 of the evaporator conduit 100 is a heat transfer element 110, which elements 110, together with the conduit 100, are preferably fabricated of a high heat conductive material, such as copper. The heat transfer elements 110 embodied in the section 54 are best depicted in FIGS. 11 through 13 and may be originally formed of relatively thin stamped metal strips so as to have a plurality of ears or lobes 112 formed along the longitudinally opposite edges thereof, with the lobes 112 defining recesses or notches 114 therebetween, as best shown in FIG. 13. In accordance with the principles of the present invention, the heat transfer elements 110 are formed (as by stamping) with a series of pockets or recesses, generally designated by the numeral 114. More particularly, and as shown in FIGS. 9 through 11, a series of longitudinally disposed recesses 116 are formed in the elements 110 in an alternate fashion, such that when the elements 110 are seen in side elevational view, the elements 110 appear to have a series of alternate concave and convex surfaces with the concave surfaces defining the recesses 116 on each side thereof. Each of the pockets or recesses 116 has a pair of the aforementioned ears or lobes laterally aligned therewith, and during the aforementioned forming or stamping operation in which the pockets 116 are formed in the elements 110, the associated lobes 112 are deformed upwardly and downwardly (as viewed in FIG. 9) relative to the plane of the elements 110, depending on the concave or convex deformation produced in the elements 110 during the forming operation, with the result that laterally aligned lobes 112 are alternately formed upwardly and downwardly along the length of the elements 110, the upwardly deformed ears 112 being identified in FIG. 9 by the reference numeral 112a, and the downwardly deformed ears 112 being designated in FIG. 9 by the numeral 112b.

The plurality of upwardly and downwardly formed lobes 112a and 112b along the length of each of the transfer elements 110 define longitudinal edge channels, as best seen in FIG. 9 and identified by the numeral 118, the dimensions of which are such as to correlate with the lateral spacing between the spaced parallel sections 102 of the evaporator conduit 100, with the result that the heat transfer elements 110 of the section 54 may be inserted interjacent or between the conduit sections 102 from the opposite sides of the serpentine formation thereof in the manner best shown in FIG. 11. Thus, the plurality of elements 110 may be inserted from the opposite side edges of the serpentine formed conduit 100 in the manner shown in FIG. 11 to a position where they are totally nested or contained between the sections 102 thereof, as is depicted in FIG. 8. After the plurality of elements 110 have thus been assembled onto the evaporator conduit 100, the entire assemblage thereof is preferably subjected to a soldering operation, or the like, whereby the elements 110 are fixedly secured to the conduit 100 in a manner such that efficient heat transfer is achieved between the conduit sections 102 and the elements 110. Thereafter, the assembly of the conduit 100 and heat transfer elements 110 is intended to be put into a suitable mold or the like, such as a plastic injection mold, whereupon a suitable polymeric plastic material, such as polyethylene or other appropriate material having the required moldable and sanitary characteristics, is formed around the aforesaid assemblage to provide the one-piece monolithic body 96. During the molding operation, liquid plastic material will flow in and around the various interstices and exterior surfaces of the evaporator conduit 100 and plurality of heat transfer elements 110 to secure the structural integrity of these respective components in their respective operative relationship, and simultaneously, the plurality of ice forming pockets 98 are formed in the opposite sides of the body 96, with each of the pockets 98 corresponding to one of the pockets 116 formed in the heat transfer elements 110 so as to provide the aforementioned staggered orientation of the ice forming pockets 98, the specific configuration or shape of which is hereinafter described.

In accordance with the principles of the present invention, the assemblage consisting of the serpentine-shaped conduit 100 and plurality of heat transfer elements 110 will find application as a heat transfer apparatus of the solar collector type in solar heating systems and the like. In particular, the aforesaid assemblage of the conduit 100 and elements 110 which are secured to the conduit 100 by soldering or the like may be used as either a primary or secondary type solar collector in solar heating systems, for example, solar water heating systems and the like well known in the art. When the assemblage is used as a primary heating means, the water to be heated by the collector may be circulated via a suitable pump or the like directly through the conduit 100 in a closed loop or circuit including a heated water storage tank, circulating pump (not shown) and conduit 100. Typically, such an installation would include a multiplicity of the aforesaid assemblages, the particular number of which would depend upon the desired heating capacity. In a secondary solar collector application, a heat transfer media (liquid), such as ethylene glycol, would be circulated through the conduit 100 by means of an ancillary pump or the like, whereby the heat transfer media would be circulated to an associated heat transfer apparatus disposed in heat transfer relationship, for example, with water to be heated in a water storage tank or the like.

As illustrated in FIG. 8a which depicts an exemplary embodiment of the assemblage consisting of the conduit 100 and transfer elements 110 as they might be utilized in a solar collector application, the plurality of arcuate concave pockets or recesses 116 provide a multiplicity of surfaces which would directly confront the sun during a significant portion of its daily movement, whereby to provide for significant heating of the elements 110 and liquid flowing through the conduit 100 without requiring that the plane of the conduit-heating element assembly be moved or adjusted in order to "follow" the sun's daily movement. Thus, a significantly greater amount of solar heating will occur due to the prolonged contact with the inner concave surfaces of the recesses 116 by the sun's rays, than comparable collector devices having relatively planar sun exposure faces or surfaces. It is to be noted that the aforesaid assemblage consisting of the conduit 100 and plurality of heat transfer elements 110 will not only act as an effective solar collector when used with a primary or secondary media being transmitted through the conduit 100, but also will find application when the media being heated is communicated via suitable conduit means located in front of said assemblage when the same is provided with a relatively reflective surface so that the surfaces of the recesses 116 will function in a reflective capacity to reflect solar energy back toward such fluid conduit means. Of course, it is also contemplated that a combination of direct and reflective solar heating could be achieved with the assemblage of the conduit 100 and elements 110 as well.

With reference to FIG. 4, it will be seen that the plastic material from which the section 54 is fabricated and which is generally designated by the numeral 120, is formed with a plurality of spaced, parallel laterally extending recesses 122 within the upper end 124 thereof. The upper end 124 is adapted to be nestingly received within the recess 72 formed in the underside of the enclosure 58 whereby ice make-up water passing downwardly through the slots 70 will flow laterally outwardly with respect to the section 54 within the recesses 122 and will thereafter be directed downwardly as the water engages generally vertically extending surfaces 125 located at the lower edges of the recess 72, resulting in the ice make-up water being deflected downwardly so that it will cascade along and over the opposite sides of that it will cascade along and over the opposite sides of the section 54 and thereby flow over and into the plurality of ice form pockets 98 during operation of the machine, as will later be described.

With reference to FIG. 19, the ice directing section 56 is generally intended to serve the function of directing ice formed within the plurality of pockets 98 away from the water sump at the lower end of the assembly 50 during the ice harvest cycle so that the ice will drop downwardly toward and into some type of an ice storage area, such as the ice storage section 16 depicted in FIG. 1, with the section 56 serving the secondary function of separating ice make-up water that is cascaded over the opposite sides of the section 54 from the ice so that the make-up water will flow into the associated sump and be utilized during subsequent operation of the machine 10. Toward this end, the ice directing section 56 in FIG. 19 is intended to be coextensive of the width of the associated section 54 and includes a generally flat or horizontally extending base portion 126 and upstanding side walls 128 and 130 which are inclined upwardly and inwardly as seen at 132 and 134 and terminate in generally horizontal upper edge portions 136 and 138 which are arranged along the opposite sides of the section 54. The inclined side portions 132, 134 serve to deflect or direct the ice dropping downwardly off of the sides of the section 54 away from the lower end thereof and are formed with suitable apertures or perforations, generally designated by the numeral 140, whereby ice make-up water being cascaded over the opposite sides of the section 54 may flow through the perforation 140 into an interior sump area 142 which may be communicable with a suitable water pump or the like so that the water may be recirculated. It is to be noted that the section 56 depicted in FIG. 19 is more or less schematic in nature and that the arrangement shown in connection with the ice making machine 300 hereinafter described consists of a more preferred form of the invention. Regardless, however, the section 56 is intended to illustrate how the ice cubes formed within the pockets 98 and subsequently dropped downwardly therefrom during a harvest cycle will be deflected outwardly away from the lower end of the section 56 and thereafter drop downwardly into an associated ice storage area.

Referring to FIGS. 14 and 15, each of the pockets 98 is of a generally square shape when viewed from the side therof (i.e., comprise four equal length side edges) and includes a central depressed or concave section 150 which is defined by the outer surface of the portion of the heat transfer element 110 located therebelow and which is bounded by four inwardly inclined side surfaces 152, 154 and 156, 158 which are of a generally arcuate configuration and are formed in the plastic material 120 embodied in the section 54. In a preferred construction of the present invention, the longitudinal and lateral side edges of each of the pockets 98 are common to the pockets 98 adjacent thereto, as depicted in FIG. 14, whereby to maximize the ice making capacity of the section 54, i.e., the number of ice cubes that can be produced along each side thereof. It will be seen that while the central part of each of the pockets 98 is formed by the central part of the associated recess 116 of the subjacent heat transfer elements 110, the outer marginal surfaces of each of the pockets 98 are spaced from the surface of the underlying recess 116 in increasing amounts toward the outer peripheral edges of the pockets 98. Thus, the thickness of the plastic material 120 between the heat transfer elements 110 and the inner surface of each of the pockets 98 increases gradually from zero (0) thickness (or a film of minimal thickness of the plastic 120 over the central part of the underlying heat transfer elements 110) to a maximum thickness directly at the peripheral edges of the pockets 98, which construction contributes to one of the primary features of the present invention. More particularly, the aforesaid construction results in the ice cubes formed within the pockets 98 being generally symmetrical in shape on the opposite sides thereof even though the ice is formed in molds (or pockets) which, during the freezing of the ice make-up water, are disposed adjacent only one of the sides of the ice product being formed. Stated another way and with reference to FIGS. 16 through 18, the ice product which is formed in accordance with the principles of the present invention is of a generally square shape, i.e., four equal length sides, in side elevational view and consists of upper and lower opposed convex sides 164 and 166, spaced parallel side edges 168 and 170, and spaced parallel top and bottom edges 172 and 174 which are arranged perpendicular to the side edges 168 and 170. The opposite surfaces 164 and 166 of the ice product are substantially symmetrical to one another and complementary in shape in respect to the interior surface of the pockets 98, with the result that the ice product is of a "pillow" shape in its finally produced form. The primary reason for the ice product being generally symmetrically-shaped, and pursuant to the principles of the present invention, is that the plastic material 120 which defines the outer marginal portions of the ice pockets 98 acts as an insulating media between the ice make-up water being cascaded over the opposite sides of the section 54 and the heat transfer elements 110 which transfer heat between the refrigerant flowing through the evaporation conduit 100 and the ice make-up water. More particularly, and as best shown in FIG. 15, it will be seen that by virtue of the fact that the heat transfer elements 110 are juxtapositioned directly adjacent and actually form the central portion of each of the pockets 98, maximum heat transfer will occur at the center thereof due to the fact that little or no plastic material 120 is provided between the surface of the elements 110 and the pockets 98.

Accordingly, the ice make-up water will freeze more readily at the central portion of the pockets 98 during a freezing operation. However, because the thickness of the plastic material 120 increases between the heat transfer elements 110 and outer marginal edges of the pockets 98, a gradually decreasing amount of heat will be transferred to the elements 110 toward the outer edges of the pockets 98 due to the fact that the plastic material 120 acts as a heat insulating (non-heat conductive) media between the ice make-up water and the adjacent surfaces of the heat transfer elements 110. Accordingly, the ice will gradually build up within the pockets 98 in the manner best depicted in FIG. 15, with the ice growing thicker and thicker at the central portion of the ice product, as depicted in the successive "growth lines" during a freezing operation. This results in the outer surface of the ice product, i.e., the surface which is not in contact with the interior periphery of the pocket 98 being convex shaped and of substantially the same configuration as the surface of the ice product which is in actual contact with the periphery of the pockets 98, with the result that the final ice product appears generally symmetrical in shape, as shown by the cross-sectional views in FIGS. 17 and 18.

With specific reference to FIG. 15, it is to be noted that each ice cube that is formed within one of the pockets 98 has the side thereof confronting the pocket 98 projecting outwardly, i.e., is of a greater convex shape, than the opposite side thereof, i.e., the side facing away from the pocket 98; however, at such time as the subsequent harvest cycle begins and hot gasses are communicated through the evaporator conduit 100, the elements 110 will begin to warm up, resulting in meltage of, the portion of the formed ice cube disposed adjacent the elements 110. Such meltage effects release of the cubes from the pockets 98 and also results in the side of the cubes having the maximum convex shape being melted away so that the cubes are of the shape shown in FIGS. 17 and 18 at the time that they drop downwarldy out of the pockets 98 into a subjacent ice storage area. Thus, one of the principals of the present invention resides in the formation of ice cubes that initially have one convex side thereof which is of greater convex shape than the opposite side thereof, but which is melted away during the harvest portion of the machine so that both of the sides of the final ice product are symmetrical once the product is harvested. Additionally, of course, one of the other important principals of the present invention is that a generally symmetrical ice product, i.e., an ice product having substantial symmetrical convex sides, can be formed in an ice mold having only a single concave surface as a result of properly correlating the amount of relatively non-heat conductive material 120 between a central heat transmitting element and the inner peripheral surface of the mold.

The above described ice product is considered to be a significant portion of the present invention in that said product has been found to embody a number of highly improved features over comparable ice products known in the art. In particular, because of the basically square, yet rounded configuration of the ice product, highly improved anti-bridging characteristics are achieved thereby. That is, due to the fact that "point" contact is primarily maintained between adjacent ice "cubes" in a storage container thereof, as opposed to surface or line contact with prior known cubes, bridging or freezing together of adjacently oriented cubes is minimized to the extreme, which results in convenient dispensing thereof even after prolonged periods of storage. Another feature of the ice product achieved in accordance with the present invention resides in highly improved displacement and splash resistant characteristics. More particularly, by virtue of the fact that the ice product nests in a highly improved fashion, a greater number of the ice "cubes" can be placed within a given size container or receptacle, resulting in commercially desirable fluid displacement characteristics. Similarly, due to the fact that the ice product of the present invention does not have any concavities or relatively flat surfaces, the splashing of liquid when it is poured or otherwise directed into a container or receptacle of the ice product is minimized to the extreme so as to obviate undesirable spillage, etc.

Referring now to FIGS. 20 through 22, a slightly modified element of the invention and in particular, the combination ice and evaporator section thereof, is designated by the numeral 200. The section 200 differs from the aforedescribed section 54 from the standpoint that instead of utilizing a plurality of heat transfer elements 110 and a separate evaporator conduit, the primary heat transfer path between the refrigerant and the ice make-up water is achieved by a plurality of spaced parallel conduits, generally designated by the numeral 202 and best depicted in FIG. 20. The conduits 202 are connected at their opposite ends to a pair of generally transversely arranged manifold members 204 and 206 which are constructed such that serial refrigerant flow may be provided from an inlet conduit 218 throughout the entire series of conduits 202 to an outlet conduit 220 which, together with the conduit 218 is connected to the associated refrigeration system. The conduits 202 are formed with alternate staggered ice form pockets or recesses 208 on the opposite sides thereof and are generally flattened in the manner best shown in the FIGS. 21 and 22 so as to define the recesses 208 and so as to also define refrigerant flow paths 210 and 212 along the opposite side portions of the conduits 202, as shown in FIG. 21. With this arrangement, the conduits serve the two-fold function of providing refrigerant flow paths and providing heat transfer surfaces for the central portions of the ice form pockets 216 which are analogous to the aforedescribed pockets 98 and which are formed in a monolithic plastic body 214 analogous to the above-described plastic material 120. In accordance with certain principles of the present invention, it is contemplated that the plurality of conduits 202 may be deformed to their undulated, pocket defining configurations shown in FIG. 22 in a suitable forming press or the like and thereafter be secure at their opposite ends to the associated manifold members 204 and 206, after which time the entire assemblage consisting of the manifolds 204 and 206 and plurality of conduits 202 could be placed back into the press forming dies which would serve the two-fold purpose of acting as the mold into which the plastic material 214 is injected. Thus, the same apparatus could be used for deforming the conduits 202 and providing the mold for the plastic material 214. In one preferred arrangement of the modified ice form and evaporator section 200, the conduits 202 are fabricated from ¾ inch thin wall copper tubing which may be deformed consistent with the configuration shown in FIGS. 21 and 22. Of course, other size tubing could be utilized without departing from the scope of the present invention.

It is to be noted that the principles of the present invention are not necessarily limited to a construction wherein the plurality of ice forming pockets are disposed along one or both sides of generally flat or planar combination ice form and evaporator member, as is the case with the ice machine hereinabove described and the ice machine 300 hereinafter described. In particular, it is contemplated that the principles of the present invention will also be applicable to a combination evaporator and ice form arrangement where the plurality of ice forming pockets are disposed on the sides of a multi-sided (more than two sides) structure and toward this end, reference is made to FIGS. 23 and 24 wherein an alternate embodiment of the combination ice form and evaporator member is disclosed and generally designated by the numeral 230. The member 230 is shown, by way of example and without intending to limit the scope of the present invention, as comprising a four-sided heat transfer member 232 consisting of four, substantially identical vertical sides 234, 236, 238 and 240 arranged in edge-to-edge relation. The member 230 is fabricated of a suitable heat transfer material, such as a thin sheet of copper, with each of the four sides 234-240 being formed with a plurality of three vertically spaced ice forming pockets 242, as best seen in FIG. 23. Disposed interiorly of the heat transfer element 232 is a generally cylindrically-shaped manifold member 244, the outer periphery of which is adapted for contiguous engagement with the inner surface of the central portion of each of the pockets 242, with the manifold member 244 defining a central chamber which is communicable with the refrigerant capillary tube 257 and outlet pipe 258 which function to supply refrigerant between an associated refrigeration system and the interior of the manifold 244, whereupon heat transfer occurs between the manifold 244 and the central part of each of the plurality of ice form pockets 242 formed in the sides 234–240 of the heat transfer element 232. The four apexes 254 of the heat transfer element defined with the outer periphery of the manifold 244, a plurality of four chambers 246, 248, 250 and 252 which may function as means to receive tap or potable thawing water during the harvest cycle to assist in releasing ice cubes from the pockets 242. The outer surface of the heat transfer member 230 is provided with a suitable heat insulating material, generally designated by the numeral 259, which is formed in essentially the same manner as the plastic 120 of the ice machine 10 so as to cooperate with the concave surfaces of the pockets 242 in defining the ice form recesses into which water is communicated during the freezing cycle. It is to be noted that instead of the water flowing into the chambers 246–252 during a harvest cycle, hot refrigerant gas may be supplied to said chamber consistent with the principles of the other embodiments of the present invention described herein. Additionally, the embodiment of the present invention shown in FIGS. 23 and 24 may be readily modified to have the refrigerant flow in and through the chambers 246, 248, 250 and 252 and defrost-make-up water enter the center cylindrical member 244 without departing from the scope of the present invention.

FIGS. 25 and 26 illustrate yet alternative embodiments to the present invention wherein the plurality of ice forming pockets or recesses need not necessarily be disposed upon relatively flat or planar evaporator members. In particular, these Figures illustrate multi-sided heat transfer members (shown as eight-sided members) with each side being provided with a series of vertically aligned pockets within which ice cubes are to be formed. In the embodiment shown in FIG. 25, the heat transfer member is designated by the numeral 260 and is shown as consisting of multiple sides 262 which define apexes 264 therebetween and have a plurality of ice forming pockets 266 therein. Each of the pockets 266 is adapted to be cooperative with an evaporator conduit 268 which extends generally parallel to the rows of pockets 266 and is secured interiorly of the member 260, whereby heat transfer is effected between the evaporator conduits 268 and the central portion of each of the pockets 266 in essentially the same manner as hereinabove described. The embodiment shown in FIG. 26 is similar to that shown in FIG. 25, with the corresponding parts being designated by like numerals; however, instead of the generally vertically arranged evaporator conduits 268 juxtaposition each of the vertical rows of pockets 266 in the embodiment of FIG. 255, a generally helically arranged evaporator conduit 270 is disposed interiorly of the assembly 260' and adapted for contact for the central portion of each of the pockets 266' for effecting heat transfer between the refrigerant in the conduit 270 and the ice make-up water introduced into the pockets 266' during a freezing cycle.

FIGS. 27 and 28 illustrates two additional alternate embodiments of the present invention and depict that the principles thereof may find application to ice making machines wherein the ice make-up water is sprayed directly upon the combination ice form and evaporator members, instead of being cascaded thereover as is the case with the ice making machines 10 and 300 as described, herein. Additionally, FIGS. 27 and 28 illustrate that the principles of the present invention lend themselves to applications wherein the combination ice form and evaporator member is disposed in either a horizontal or inclined position, as opposed to a vertical orientation. More particularly, and with reference to FIG. 27, a combination ice form evaporator assembly 272 is shown as being of substantially the same construction as depicted in FIG. 8, with the exception that the assembly 272 has the ice forming pockets 274 thereof formed only on the lower side thereof. The assembly 272 is provided with suitable evaporator conduits 276 which may be analogous to the aforedescribed conduit 100 and have a plurality of heat transfer elements 278 interposed between adjacent sections of the conduit 276 so as to partially define the ice forming pockets 274 which face downwardly. The assembly is provided with the hereinabove described heat insulating plastic material, generally designated by the numeral 280 which, together with the heat transfer elements 278 define the pockets 274 which are preferably of substantially the same configuration as the hereinabove described pockets 98. The entire assembly 272 is operatively supported upon a generally horizontally arranged ledge or flange 282 with a spray enclosure 284 which includes a water spray bar 286 adjacent the lower end thereof having suitable drive means 288 for effecting rotation or oscillatory movement of the spray bar 286 so that ice make-up water will be sprayed or directed upwardly toward the underside of the assembly 272 and into the pockets 274, resulting in ice cubes forming therein during a freezing cycle. A suitable screen or the like 290 is disposed between the underside of the assembly 272 and the spray bar 286, whereby ice released from the pockets 274 during a subsequent harvest cycle will drop downwardly onto the screen and be directed through an ice opening 292 to a remotely located ice storage area or the like, generally designated by the numerals 294, which may be located below the enclosure 282.

The arrangement shown in FIG. 28 is substantially identical to that shown in FIG. 27 with the correlative components being designated by like numerals with a prime suffix, with the exception that the combination ice form and evaporator assembly 272' is mounted in a relatively inclined orientation, as opposed to the generally horizontal position shown in FIG. 27. The inclined orientation lends itself to rapid release of the ice products formed during a preceding freezing cycle by means of a hot gas defrost and/or hot water which may either be sprayed or cascaded upon the underside of the ice form assembly 272', as will be described in connection with the overall operation of the present invention.

Referring now to FIGS. 29–39, an ice making machine 300, in accordance with another preferred embodiment of the present invention, is shown generally as comprising an exterior housing or enclosure 302 having a front or forward, generally vertically disposed wall section 304 and a rearward, generally vertically disposed wall section 306. Extending between the front and rear wall sections 304 and 306 at the laterally opposite sides or ends of the enclosure 302 is a pair of upstanding end wall sections 308 and 310. A generally vertically disposed partition 312 also extends between the wall sections 304, 306 and divides the interior of the enclosure 312 into a refrigeration area 314 and an ice making area 320 which are respectively disposed at the lefthand and righthand sides of the machine 300 as it is depicted in FIGS. 29 and 30.

As was the case in connection with the hereinabove described ice making machine 10, the refrigeration area 314 is provided with conventional refrigeration equipment, generally designated by the numeral 316, including a compressor, condenser, etc., with the area 314 also housing a water pump 318 which is intended to supply make-up water to the ice making apparatus disposed within the ice making area 320 in a manner hereinafter to be described.

Generally speaking, the ice producing apparatus within the ice making area 320 of the ice making machine 300 comprises a water manifold assembly, generally designated by the numeral 322, a water sump assembly generally designated by the numeral 324, and a plurality of four combination ice forms and evaporator members, generally designated by the numeral 326, which are similar in construction and operation to the aforementioned combination ice form and evaporator sections 54 hereinabove described. As will be described in connection with the overall operation of the ice making machine 300, the water manifold assembly 322 is intended to supply water to the plurality of ice form and evaporator members 326 which operate to effect freezing of the water to produce ice cubes of the type hereinabove described. Excess make-up water is accumulated within the water sump 324 and is re-circulated back to the water manifold assembly 322, as will hereinafter be described in detail.

Referring now in detail to the construction of the water sump assembly 324, as depicted in FIGS. 34, 35 and 38, the assembly 324 comprises a one-piece molded monolithic body 330 fabricated of a suitable polymeric material having the requisite sanitary characteristics and which is entirely open on the upper side thereof. The body 330 comprises an elongated central section 332 which extends laterally of the enclosure 302, i.e., parallel to the front and rear wall sections 304, 306 at a position below the plurality of evaporator members 326. Extending at generally right angles to the central section 332 of the body is a plurality of eight arm sections 334 which are arranged in four spaced parallel rows each consisting of two aligned arm sections 334, as best seen in FIG. 34, with each row being located directly below one of the evaporator members 326. The sump assembly 324 comprises a generally vertically disposed side wall section 336 which extends entirely around the body 330 and which is integrally connected at its lower edge to a bottom closure or wall of the water sump 324. In particular, the central section 332 of the body 330 includes a downwardly sloped bottom wall portion 338 that defines, at its lowermost portion thereof, a water reservoir 340 which may, if desired, be provided with a suitable clean-out facility 342, i.e., clean-out plug, drain line, etc. The end of the central section 332 of the water sump assembly 324 adjacent the reservoir 340 is provided with a plurality of three openings, namely, a lower opening 346, an intermediate opening 348, and an upper opening 350 which are intended to cooperate with suitable water conduits hereinafter to be described in communicating water between the interior of the sump assembly 324 and the aforedescribed water pump 318. Each of the arm sections 334 of the body 330 is provided with a sloped bottom 352, all of which bottom sections are sloped downwardly from the outer ends thereof toward the central section 332, as best depicted in FIG. 35, whereby water dropping downwardly into the arm sections 334 will flow inwardly or centrally toward the central section 332 and be communicated via the sloped bottom 338 toward and into the reservoir 340 disposed in the lower portion of the central section 332 of the body 330. As best seen in FIG. 31, the outer end of each of the arm sections 334 is provided with an embossment 354 in the side wall section 336 thereof, which embossments 354 define internal recesses 356 which are intended to function in a manner hereinafter described in operatively supporting the entire water sump assembly 324 upon the lower ends of the plurality of four combination ice form and evaporator members 326.

Referring now to the construction of the water manifold assembly 322, as best shown in FIGS. 36, 37 and 39, said assembly 322 comprises a primary supply conduit section, generally designated by the numeral 360, which is adapted to be connected in a manner hereinafter to be described to the aforementioned water pump 318. The conduit section 360 extends laterally within the ice making area 320 of the enclosure 302, i.e., parallel to the front and rear wall section 304, 306 at a position directly above the plurality of evaporator members 326 and generally vertically aligned with and parallel to the central section 332 of the water sump assembly 324. The conduit section 360 is provided with a central inlet fitting 362 which is located intermediate the opposite ends thereof and is intended to be communicable with a water supply conduit 454 which is connected to the water pump 318, as best seen in FIG. 29. As illustrated in FIG. 37, the primary conduit section 360 is provided with a plurality of four longitudinally spaced pairs of opposed outlet sections 364, 366, 368 and 370 which are spaced apart a distance equal to the lateral spacing between the evaporator members 326. Attached to each of the outlet sections 364–370 is an elongated manifold member, one of which is shown in FIG. 39 and generally designated by the numeral 372. As shown in FIG. 39, each of the manifold member 372 includes an elongated bore 374 which is tapered radially inwardly, i.e., decreases in cross-sectional area toward the outer end of the manifold member 372. The bore 374 of each of the members 372 is communicable with a plurality of generally vertically arranged, longitudinally spaced discharge ports 376 which extend between the bore 374 and the interior of an elongated cavity 378 formed in the underside of each of the manifold members 372. As best seen in FIG. 38, the cavity 378 is defined between a pair of spaced apart downwardly extending side portions 380 and 382 which are formed integrally of the manifold member 372 which, in a preferred construction of the present invention, is preferably fabricated of a molded polymeric material, such as Celcon or the like. The lower ends of the side portions 380 and 382 define water deflecting recesses or surfaces 384 which function in a manner hereinafter to be described in directing water flowing downwardly from the bore 374 through the discharge ports 376 into the cavity 378 toward and over the opposite sides of the combination ice form and evaporator members 326 which are disposed below the mainfold members 372.

The end of each of the manifold members 372 which is connected to the primary conduit section 360 is formed with an enlarged diameter counterbore 386 which is arranged coaxially of the associated bore 374 and adapted to nestingly receive one of the laterally outwardly extending outlet sections 364–370 in the manner shown in FIG. 39, whereby said outlet section 364 is nestingly received within counterbore 386 of the manifold member 372. The end of the manifold member 372 confronting the conduit section 360 is formed with a semi-circular end surface 388 which is complementary in shape in respect to the outer periphery of the conduit section 360 and adapted to be contiguously engaged therewith upon assembly of the manifold member onto the associated of the outlet sections 364-370. Preferably, the surface 388 of each of the manifold members 372 is of a length slightly in excess of one-half the circumference of the associated conduit section 360 such that the manifold member 372 may be "snapped" onto the conduit section 360. As shown in FIG. 36, the uppermost portion of the inner end of each of the manifold members 372 is generally step-shaped so that, as seen at 390, the upper ends of opposed members 372 may nest together when they are assembled onto the primary conduit section 360. As will hereinafter be described in detail, ice make-up water supplied to the primary conduit section 360 via the inlet fitting 362 and conduit 454 will be communicated longitudinally along the entire length of the conduit section 360. This water will thereafter be communicated outwardly through the plurality of outlet sections 364-370 and be introduced into the bores 374 of the plurality of manifold members 372 attached to the opposite sides of the primary conduit section 360. The water communicated into the bores 374 will be discharged downwardly through the plurality of the discharge ports 376 and will flow into the cavity 378 of each of the members 372, whereupon the water will flow downwardly from the caiity 378 and cascade along the opposite sides of the combination ice form and evaporator members 326 located therebelow.

Referring now to the plurality of combination ice form and evaporator members 326, each of the members 326 is preferably of the same general construction and operation and therefore the following description of one of said members is intended to be applicable to each of the members 326 embodied in the ice making machine 300.

The member 326 is preferably similar in construction and operation to the hereinabove described combination ice form evaporator members or sections 54 and as such, consists of a molded plastic body, generally designated by the numeral 400, having a generally serpentine-shaped evaporator conduit 402 disposed interiorly thereof and which is analogous in construction and operation to the evaporator conduit 100 embodied in the aforementioned section 54. The evaporator conduit 402 of each of the members 326 is communicable with the associated refrigeration system in the refrigeration area 314 by means of supply and return conduits 404 and 406. A plurality of heat transfer elements, generally designated by the numeral 408, and similar in construction and operation to the elements 110 of the combination ice form and evaporator section 54 are interposed between the spaced parallel portions of the evaporator conduit 402, with the conduit 402 and plurality of elements 408 being embedded within the plastic material of the body 400 in the manner hereinabove described. The opposite sides of the body 400 are provided with a plurality of vertical rows of ice forming pockets or recesses, generally designated by the numeral 410, which again are similar in construction and operation to the aforedescribed pockets or recesses 98 of the section 54 and accordingly, a further description of the pockets 410 is omitted for purposes of conciseness of description herein, it being sufficient to state that the pockets 410 are intended to have ice make-up water cascaded thereover and be frozen therewithin during a freezing cycle and have the resultant ice product or ice cubes be released during a subsequent harvest cycle so as to drop downwardly into an associated ice receiving area disposed below the plurality of members 326, as will be apparent from the above description of the ice making machine 10 of the present invention.

As best seen in FIGS. 31, 38 and 39, the upper end of each of the members 326 is formed with a reduced thickness portion 412 which is adapted to be nestingly received within the lower end of the cavity 378 of the two manifold members 372 associated therewith. The upper end portion 412 is formed with a plurality of transversely extending spaced, parallel slots or recesses 416 which are spaced longitudinally along the upper edge of the member 326 and are adapted to communicate with the interior of the cavities 378 of the associated manifold members 372, whereby ice make-up water within the cavities 378 may flow downwardly into the slots 416 and thereafter flow outwardly toward and impinge against the surfaces 384, where the make-up water will be deflected downwardly so as to flow or cascade over the opposite sides of the body 400.

Each of the combination ice form and evaporator members 326 comprises a lower end 418 which is provided with a pair of opposed, outwardly projecting shoulders or ridges 420 that extend substantially along the entire length of each side of the body 400 and define outwardly and downwardly inclined upper ice deflecting surfaces 422. The shoulders or ridges 420 on the opposite sides of the body 400 are formed with a plurality of spaced apart, vertically arranged slots 424 through which ice make-up water is intended to flow after it cascades down the opposite sides of the body 400, with such water subsequently dropping into the associated arm section 334 of the sump assembly 324. The inclined upper surfaces 422 of the shoulders 420 are intended to act as an ice deflecting means, whereby ice released from the plurality of pockets 410 during the harvest portion of the operational cycle of the ice making machine 300 will drop downwardly and strike or engage the surfaces 422 and be deflected outwardly away from the adjacent sump arm sections 334 and into the ice receiving area located below the sump assembly 324, with the ice make-up water cascading over the opposite sides of the body 400 passing downwardly through the plurality of slots or recesses 424 directly into the sump assembly 324 for recirculation.

As best seen in FIG. 31, each of the combination ice form and evaporator members 326 is provided with a pair of cylindrical lugs formed on the opposite sides thereof and located generally centrally of the lowermost portions thereof. The lugs 426, 428 are intended to cooperate with inverted V-shaped shoulders 430 and retaining flanges 432 located between the lugs 426, 428 on each side of each of the bodies 400 in operatively supporting a plurality of sump covers, generally designated by the numeral 460, that are disposed over the central section 332 of the sump assembly 324 and positioned one between each adjacent pair of members 326 so as to prevent the ice product being formed in the pockets 410 of the members 326 from falling downwardly into the central section 332 of the sump 324. In the embodiment of the present invention shown in FIGS. 29 and 30, three of the members 460 are interposed between the four combination ice form and evaporator members 326 and supported at their respective opposite ends by means of the cylindrical lugs 426, 428, shoulders 430 and retaining flanges 432. Although not shown herein, the opposite ends of each of the sump arm sections 334 may be provided with similar type cover members which prevent the ice cubes from dropping into the ends of the sump arm sections 334, as will be appreciated by those skilled in the art.

The lower opposite edges of each of the combination ice form and evaporator members 326 are provided with a pair of outwardly projecting mounting lugs 434 and 436 which, as best seen in FIG. 31, are adapted to be nestingly received within the recesses 356 of the associated embossments 354 in the arm sections 334 of the sump assembly 324, whereby the entire sump assembly 324 is detachably supported on the lower ends of the plurality of members 326 and depends downwardly therefrom. The entire assemblage consisting of the plurality of combination ice form and evaporator members 326, sump assembly 324 and the manifold assembly 322 mounted on the upper edges of the members 326 is intended to be supported within the ice making area 320 of the enclosure 302 by means of a plurality of outwardly extending lugs 440, 442 and 444 that are formed on the opposite side edges of the members 326 and the rearward ones of which 440 and 442 are intended to be inserted within suitable complementary openings in the rearward wall 306 (or sanitary liner, etc.) of the ice making area 320 of the enclosure 302 for operatively supporting members 326 therewithin. The front or forward edges of the members 326 have the lugs 444 vertically arranged such that they may be received within suitable openings 448 within a horizontally extending retaining bar 450 which extends between the end wall 310 and partition 312 in a manner best shown in FIGS. 29 and 31. With this arrangement, the members 326 are suitably supported within the area 320, with the manifold assembly 322 being surmounted on the upper edges thereof and the entire water sump assembly 324 being supported from the lowermost portions thereof. It will be appreciated that various other types of supporting means may be provided for operatively securing the members 326, manifold assembly 322 and sump assembly 324 within the area 320 without departing from the scope of the present invention; however, the aforedescribed mode of operatively mounting these components lends itself to ease of construction, convenience of assembly and disassembly for purposes of cleaning and the like.

The water system of the ice making machine 300 includes the aforementioned water pump 318 which is intended to be communicable with the water sump assembly 324 via the openings 346, 348 and 350 formed in the end wall portion 344 thereof. In particular, the opening 346 is adapted to be communicable with the inlet portion of the water pump 318 via a suitable water conduit 452, whereas the outlet portion of the pump 318 is adapted to be communicable via the aforementioned water supply pipe or conduit 454 with the water manifold assembly 322. The discharge from the pump 318 is also connected to the sump assembly 324 via a suitable conduit 454 which is communicable with the opening 348. Finally, the pump 318 is connected via a suitable overflow conduit 456 with the opening 350 of the sump assembly 324 for the purposes best described in U.S. Pat. No. 3,559,424 which is incorporated by reference herein. Briefly, however, it should be noted that the pump 318 includes a suitable impeller or the like (not shown) which is drivingly connected via a drive shaft with the pump motor, whereupon energization of the motor, water will be pumped from the sump assembly 324 via the conduit 454 to the manifold assembly 322. The purpose of the conduit 456 is to communicate any water which may tend to the rise along the aforementioned drive shaft during operation of the pump motor back to the sump assembly 324 so as to minimize the need for packings, seals or the like on the upper end of the shaft, as described in detail in the aforementioned '424 patent. A suitable float operated water valve (not shown) is preferably employed for sensing the water level in the sump assembly 324 and enabling water replenishment at appropriate times from any convenient water source which is commonly available, as will be appreciated by those skilled in the art.

Operation of each of the ice making machines described hereinabove is essentially the same in that during a freezing cycle, ice make-up water is communicated to the combination ice form and evaporator component, whereupon the water cascades over and into the plurality of ice forming pockets, the excess water being communicated back by an associated sump where the water may be recirculated. At the same time, refrigerant is circulated through the evaporator conduit or coils to reduce the temperature of the ice forming pockets, resulting in the ice make-up water freezing in the manner best depicted in FIG. 15. After a predetermined period of time, determined primarily by the size and shape of the ice product to be produced, the freezing cycle is terminated and the harvest cycle is initiated. During the harvest cycle, previously formed ice cubes are released from the ice forming pockets in any one of a number of ways consistent with the principles of the present invention. First of all, a hot gas refrigerant may be communicated through the evaporator coil(s) in order to raise the temperature of the heat transfer elements and hence raise the temperature of the associated pockets, whereupon the ice cubes within the pockets will be released and drop under the influence of gravity downwardly toward an associated ice receiving storage area. Release of the cubes from the pockets may be accelerated by continuing to flow (cascade or spray) water over the cubes, so as to reduce the time of the harvest cycle. Of course, various combinations of hot gas and continued water flow may be adopted, or alternatively, one of these methods may be adopted exclusively. After termination of the harvest cycle, the next successive freezing cycle may be initiated, whereupon cooled and liquified refrigerant will again be circulated through the evaporator conduit to form the next "batch" of ice within the pockets of the combination ice form and evaporator members. As will be apparent to those skilled in the art, a suitable autommtic shut-off mechanism may be provided in the control circuitry for the present invention. Typically, such shut-off controls include an ice level sensing member which is actuatable in response to the ice level reaching a predetermined height within the associated storage bin for opening the control circuit, thus, effecting deenergization of the ice making machine until such time as the ice level drops to some predetermined magnitude.

One of the features of the present invention achieved, for example, by the ice making machine 300, resides in the fact that the plurality of combination ice form and evaporator members are disposed in a vertical orientation and are spaced apart from one another, as are their associated sources of water, i.e., water manifolds, and water sump. This arrangement provides for the stacking of successive machines, one on top of one another, whereby the ice produced by an upper machine may drop downwardly through a suitable opening in the lower end of the upper machine housing and thereafter drop downwardly between the water manifolds, evaporator members and sump of a subjacent machine to some ice storing or receiving area located below the stacked machines. Thus, a plurality of such machines may be stacked one upon another with the various evaporator members, manifold and sump sections being in generally vertical alignment so as to define ice flow paths therebetween which permit the ice from the upper machines to drop downwardly past the evaporator members, manifold members and sump members of the lower machines without in any way interferring with the operation of the lower machines, whereby to provide for extremely high ice producing capacity for a given amount of floor space.

As previously discussed, other features of the present invention include the resultant ice product having highly improved splash resistance and displacement characteristics, as compared to prior known ice products. This is achieved by the fact that the ice product is entirely void of any concavities and is of a basically square, yet "rounded" configuration, which also contributes to improved storability without significant bridging or freezing of the cubes during prolonged storage thereof. Additionally, the present invention provides for universality of application by virtue of the fact that the combination ice form and evaporator members thereof may be operatively mounted in vertical, horizontal or inclined orientations and may be supplied with water from a cascading water source, or alternatively from a source of sprayed water. By virtue of the fact that moving parts are minimized to the extreme, maintenance of the present invention will be minimized, as will attendant "down-time" for repairs, service, etc. Additionally, the present invention will find wide and varied application due to the fact that a greater or lesser number of the combination ice form and evaporator members may be utilized in a given installation and such members may be easily replaced with similar members having ice forming pockets of either smaller or larger sizes so as to effect a corresponding change in the size of the ice product used. Yet additional features of the present invention reside in the extreme compactness of the ice making components thereof whereby to provide for an increase in ice making capacity for a given size installation. Moreover, and of no less importance, is the fact that the ice producing capacity of the invention has been found to be significantly increased as compared to prior art devices utilizing the same size energy consuming refrigeration components, with the result that the ice making machine of the present invention will be found to produce a greater volume of ice products for a given amount of available energy, thereby providing for energy conservation and/or reduced operating expenses.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

I claim:

1. A solar collector-type heat transfer apparatus comprising,
    an elongated serpentine arranged conduit defining spaced parallel conduit sections sequentially connected by integral U-shaped conduit portions,
    said conduit being adapted to have a heat transfer media communicated therethrough,
    a plurality of heat transfer elements disposed one between adjacent pairs of said parallel conduit sections,
    said heat transfer elements defining rows of open-sided recesses each having an internal concave surface,
    said heating transfer elements being fixedly secured to said conduit and having longitudinal edge portions secured to said parallel conduit sections, each of said heat transfer elements having edge portions along the longitudinally opposite side edges thereof, with said edge portions being alternately deformed away from the plane of said elements so as to define pairs of longitudinal channels which at least partially receive the associated pair of parallel conduit sections.

2. The invention as set forth in claim 1 wherein said heat transfer elements define recesses on the opposite sides thereof.

3. The invention as set forth in claim 2 wherein the recesses on the opposite sides of each of said heat transfer elements are alternately arranged.

4. The invention as set forth in claim 2 wherein said recesses define internal surfaces of an arcuate concave configuration.

* * * * *

UNITED STATES PATENT AND TRADEMARK OFFICE
CERTIFICATE OF CORRECTION

PATENT NO. : 4,425,964
DATED : January 17, 1984
INVENTOR(S) : Kenneth L. Nelson

It is certified that error appears in the above-identified patent and that said Letters Patent is hereby corrected as shown below:

Column 2, line 40, "maching" should be --machine--.

Column 8, line 18, "plurlity" should be --plurality--.

Column 8, line 25, "recpect" should be --respect--.

Column 10, line 64-65, Delete "that it will cascade along and over the opposite sides of" (repeated)

Column 13, line 56, "element" should be --embodiment--.

Column 15, line 55, "255" should be --25--.

Column 18, line 37, "member" should be --members--.

Column 19, line 29, "caiity" should be --cavity--.

Column 22, line 51, "automtic" should be --automatic--.

Signed and Sealed this

Fifteenth Day of May 1984

[SEAL]

Attest:

GERALD J. MOSSINGHOFF

Attesting Officer    Commissioner of Patents and Trademarks